(12) United States Patent
Rosenberg et al.

(10) Patent No.: US 8,031,181 B2
(45) Date of Patent: Oct. 4, 2011

(54) HAPTIC FEEDBACK FOR TOUCHPADS AND OTHER TOUCH CONTROLS

(75) Inventors: Louis B. Rosenberg, San Jose, CA (US); James R. Riegel, Santa Clara, CA (US)

(73) Assignee: Immersion Corporation, San Jose, CA (US)

( * ) Notice: Subject to any disclaimer, the term of this patent is extended or adjusted under 35 U.S.C. 154(b) by 805 days.

(21) Appl. No.: 11/981,501

(22) Filed: Oct. 30, 2007

(65) Prior Publication Data

US 2008/0062122 A1 Mar. 13, 2008

Related U.S. Application Data

(63) Continuation of application No. 11/405,811, filed on Apr. 17, 2006, now Pat. No. 7,592,999, which is a continuation of application No. 10/213,940, filed on Aug. 6, 2002, now Pat. No. 7,148,875, which is a continuation of application No. 09/487,737, filed on Jan. 19, 2000, now Pat. No. 6,429,846, which is a continuation-in-part of application No. 09/467,309, filed on Dec. 17, 1999, now Pat. No. 6,563,487, which is a continuation-in-part of application No. 09/253,132, filed on Feb. 18, 1999, now Pat. No. 6,243,078, which is a continuation-in-part of application No. 09/156,802, filed on Sep. 17, 1998, now Pat. No. 6,184,868, which is a continuation-in-part of application No. 09/103,281, filed on Jun. 23, 1998, now Pat. No. 6,088,019.

(51) Int. Cl.
*G09G 5/00* (2006.01)

(52) U.S. Cl. ........................ 345/173; 178/18.01; 463/30

(58) Field of Classification Search .................. 345/156, 345/173–183; 178/18.01, 19.01; 715/701–702; 463/30, 36–38
See application file for complete search history.

(56) References Cited

U.S. PATENT DOCUMENTS 2,972,140 A 2/1961 Hirsch
(Continued)

FOREIGN PATENT DOCUMENTS

DE 19911416 11/2000
(Continued)

OTHER PUBLICATIONS

Adachi et al., "Sensory Evaluation of Virtual Haptic Push-Buttons," 1994, Suzuki Motor Corp., pp. 1-7.
(Continued)

*Primary Examiner* — Abbas Abdulselam
(74) *Attorney, Agent, or Firm* — Womble Carlyle Sandridge & Rice, PLLC

(57) ABSTRACT

A haptic feedback planar touch control used to provide input to a computer. A touch input device includes a planar touch surface that inputs a position signal to a processor of the computer based on a location of user contact on the touch surface. The computer can position a cursor in a displayed graphical environment based at least in part on the position signal, or perform a different function. At least one actuator is also coupled to the touch input device and outputs a force to provide a haptic sensation to the user contacting the touch surface. The touch input device can be a touchpad separate from the computer's display screen, or can be a touch screen. Output haptic sensations on the touch input device can include pulses, vibrations, and spatial textures. The touch input device can include multiple different regions to control different computer functions.

35 Claims, 5 Drawing Sheets

U.S. PATENT DOCUMENTS

| | | |
|---|---|---|
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,623,064 A | 11/1971 | Kagan |
| 3,875,488 A | 4/1975 | Crocker et al. |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |
| 3,923,166 A | 12/1975 | Fletcher et al. |
| 4,023,290 A | 5/1977 | Josephson |
| 4,101,884 A | 7/1978 | Benton, Jr. |
| 4,108,146 A | 8/1978 | Golden |
| 4,108,164 A | 8/1978 | Hall, Sr. |
| 4,127,752 A | 11/1978 | Lowthorp |
| 4,160,508 A | 7/1979 | Frosch et al. |
| 4,236,325 A | 12/1980 | Hall et al. |
| 4,242,823 A | 1/1981 | Bruno |
| 4,262,549 A | 4/1981 | Schwellenbach |
| 4,333,070 A | 6/1982 | Barnes |
| 4,334,280 A | 6/1982 | McDonald |
| 4,398,889 A | 8/1983 | Lam et al. |
| 4,414,537 A | 11/1983 | Grimes |
| 4,414,984 A | 11/1983 | Zarudiansky |
| 4,436,188 A | 3/1984 | Jones |
| 4,464,117 A | 8/1984 | Forest |
| 4,477,043 A | 10/1984 | Repperger |
| 4,484,179 A | 11/1984 | Kasday |
| 4,484,191 A | 11/1984 | Vavra |
| 4,513,235 A | 4/1985 | Acklam et al. |
| 4,542,375 A | 9/1985 | Alles et al. |
| 4,545,023 A | 10/1985 | Mizzi |
| 4,550,221 A | 10/1985 | Mabusth |
| 4,557,275 A | 12/1985 | Dempsey, Jr. |
| 4,560,983 A | 12/1985 | Williams |
| 4,581,491 A | 4/1986 | Boothroyd |
| 4,584,625 A | 4/1986 | Kellogg |
| 4,599,070 A | 7/1986 | Hladky et al. |
| 4,603,284 A | 7/1986 | Perzley |
| 4,604,016 A | 8/1986 | Joyce |
| 4,689,449 A | 8/1987 | Rosen |
| 4,692,756 A | 9/1987 | Clark |
| 4,706,294 A | 11/1987 | Ouchida |
| 4,708,656 A | 11/1987 | De Vries et al. |
| 4,713,007 A | 12/1987 | Alban |
| 4,715,235 A | 12/1987 | Fukui et al. |
| 4,757,453 A | 7/1988 | Nasiff |
| 4,758,165 A | 7/1988 | Tieman et al. |
| 4,763,356 A | 8/1988 | Day, Jr. et al. |
| 4,771,344 A | 9/1988 | Fallacaro et al. |
| 4,772,205 A | 9/1988 | Chlumsky et al. |
| 4,782,327 A | 11/1988 | Kley et al. |
| 4,791,416 A | 12/1988 | Adler |
| 4,794,384 A | 12/1988 | Jackson |
| 4,794,392 A | 12/1988 | Selinko |
| 4,795,296 A | 1/1989 | Jau |
| 4,800,721 A | 1/1989 | Cemenska et al. |
| 4,821,030 A | 4/1989 | Batson et al. |
| 4,823,634 A | 4/1989 | Culver |
| 4,837,734 A | 6/1989 | Ichikawa et al. |
| 4,839,838 A | 6/1989 | LaBiche et al. |
| 4,851,820 A | 7/1989 | Fernandez |
| 4,853,874 A | 8/1989 | Iwamoto et al. |
| 4,861,269 A | 8/1989 | Meenen, Jr. |
| 4,868,549 A | 9/1989 | Affinito et al. |
| 4,871,992 A | 10/1989 | Petersen |
| 4,885,565 A | 12/1989 | Embach |
| 4,891,764 A | 1/1990 | McIntosh |
| 4,896,554 A | 1/1990 | Culver |
| 4,906,843 A | 3/1990 | Jones et al. |
| 4,914,624 A | 4/1990 | Dunthorn |
| 4,926,879 A | 5/1990 | Sevrain et al. |
| 4,930,770 A | 6/1990 | Baker |
| 4,934,694 A | 6/1990 | McIntosh |
| 4,935,728 A | 6/1990 | Kley |
| 4,949,119 A | 8/1990 | Moncrief et al. |
| 4,961,038 A | 10/1990 | MacMinn |
| 4,977,298 A | 12/1990 | Fujiyama |
| 4,983,901 A | 1/1991 | Lehmer |
| 5,004,391 A | 4/1991 | Burdea |
| 5,007,300 A | 4/1991 | Siva |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin et al. |
| 5,038,089 A | 8/1991 | Szakaly |
| 5,044,956 A | 9/1991 | Behensky et al. |
| 5,065,145 A | 11/1991 | Purcell |
| 5,076,517 A | 12/1991 | Ferranti et al. |
| 5,078,152 A | 1/1992 | Bond |
| 5,095,303 A | 3/1992 | Clark et al. |
| 5,103,404 A | 4/1992 | McIntosh |
| 5,107,080 A | 4/1992 | Rosen |
| 5,107,262 A | 4/1992 | Cadoz et al. |
| 5,116,180 A | 5/1992 | Fung et al. |
| 5,121,091 A | 6/1992 | Fujiyama |
| 5,133,076 A | 7/1992 | Hawkins et al. |
| 5,139,261 A | 8/1992 | Openiano |
| 5,143,505 A | 9/1992 | Burdea et al. |
| 5,146,566 A | 9/1992 | Hollis, Jr. et al. |
| 5,159,159 A | 10/1992 | Asher |
| 5,165,897 A | 11/1992 | Johnson |
| 5,172,092 A | 12/1992 | Nguyen et al. |
| 5,175,459 A | 12/1992 | Danial et al. |
| 5,184,319 A | 2/1993 | Kramer |
| 5,184,868 A | 2/1993 | Nishiyama |
| 5,185,561 A | 2/1993 | Good et al. |
| 5,186,629 A | 2/1993 | Rohen |
| 5,186,695 A | 2/1993 | Mangseth et al. |
| 5,189,355 A | 2/1993 | Larkins et al. |
| 5,193,963 A | 3/1993 | McAffee et al. |
| 5,197,003 A | 3/1993 | Moncrief et al. |
| 5,203,563 A | 4/1993 | Loper, III |
| 5,212,473 A | 5/1993 | Louis |
| 5,220,260 A | 6/1993 | Schuler |
| 5,223,658 A | 6/1993 | Suzuki |
| 5,223,776 A | 6/1993 | Radke et al. |
| 5,235,868 A | 8/1993 | Culver |
| 5,237,327 A | 8/1993 | Saitoh et al. |
| 5,240,417 A | 8/1993 | Smithson et al. |
| 5,262,777 A | 11/1993 | Low et al. |
| 5,264,768 A | 11/1993 | Gregory et al. |
| 5,270,710 A | 12/1993 | Gaultier et al. |
| 5,271,290 A | 12/1993 | Fischer |
| 5,275,174 A | 1/1994 | Cook |
| 5,275,565 A | 1/1994 | Moncrief |
| 5,283,970 A | 2/1994 | Aigner |
| 5,286,203 A | 2/1994 | Fuller et al. |
| 5,296,871 A | 3/1994 | Paley |
| 5,299,810 A | 4/1994 | Pierce |
| 5,302,132 A | 4/1994 | Corder |
| 5,309,140 A | 5/1994 | Everett |
| 5,313,230 A | 5/1994 | Venolia et al. |
| 5,316,017 A | 5/1994 | Edwards et al. |
| 5,334,027 A | 8/1994 | Wherlock |
| 5,341,459 A | 8/1994 | Backes |
| 5,354,162 A | 10/1994 | Burdea et al. |
| 5,355,148 A | 10/1994 | Anderson |
| 5,376,948 A | 12/1994 | Roberts |
| 5,381,080 A | 1/1995 | Schnell et al. |
| 5,389,849 A | 2/1995 | Asano et al. |
| 5,389,865 A | 2/1995 | Jacobus et al. |
| 5,396,266 A | 3/1995 | Brimhall |
| 5,398,044 A | 3/1995 | Hill |
| 5,399,091 A | 3/1995 | Mitsumoto |
| 5,405,152 A | 4/1995 | Katanics et al. |
| 5,414,337 A | 5/1995 | Schuler |
| 5,432,531 A | 7/1995 | Calder et al. |
| 5,436,622 A | 7/1995 | Gutman et al. |
| 5,437,607 A | 8/1995 | Taylor |
| 5,450,613 A | 9/1995 | Takahara et al. |
| 5,451,924 A | 9/1995 | Massimino et al. |
| 5,457,479 A | 10/1995 | Cheng |
| 5,459,382 A | 10/1995 | Jacobus et al. |
| 5,461,711 A | 10/1995 | Wang et al. |
| 5,466,213 A | 11/1995 | Hogan |

| | | | | | | |
|---|---|---|---|---|---|---|
| 5,471,571 A | 11/1995 | Smith et al. | | 5,823,876 A | 10/1998 | Unbehand |
| 5,473,235 A | 12/1995 | Lance et al. | | 5,825,308 A | 10/1998 | Rosenberg |
| 5,473,344 A | 12/1995 | Bacon et al. | | 5,828,197 A | 10/1998 | Martin et al. |
| 5,491,477 A | 2/1996 | Clark et al. | | 5,828,364 A | 10/1998 | Siddiqui |
| 5,506,605 A | 4/1996 | Paley | | 5,831,408 A | 11/1998 | Jacobus et al. |
| 5,512,919 A | 4/1996 | Araki | | 5,832,386 A | 11/1998 | Nojima et al. |
| 5,513,100 A | 4/1996 | Parker et al. | | 5,835,080 A | 11/1998 | Beeteson et al. |
| 5,521,336 A | 5/1996 | Buchanan et al. | | 5,844,392 A | 12/1998 | Peurach et al. |
| 5,530,455 A | 6/1996 | Gillick et al. | | 5,844,506 A | 12/1998 | Binstead |
| 5,542,672 A | 8/1996 | Meredith | | 5,877,748 A | 3/1999 | Redlich |
| 5,547,382 A | 8/1996 | Yamasaki | | 5,880,714 A | 3/1999 | Rosenberg et al. |
| 5,557,365 A | 9/1996 | Ohsawa | | 5,884,029 A | 3/1999 | Brush, II et al. |
| 5,562,707 A | 10/1996 | Prochazka et al. | | 5,887,995 A | 3/1999 | Holehan |
| 5,563,632 A | 10/1996 | Roberts | | 5,889,236 A | 3/1999 | Gillespie et al. |
| 5,565,887 A | 10/1996 | McCambridge et al. | | 5,889,670 A | 3/1999 | Schuler et al. |
| 5,575,761 A | 11/1996 | Hajianpour | | 5,896,125 A | 4/1999 | Niedzwiecki |
| 5,576,727 A | 11/1996 | Rosenberg et al. | | 5,897,437 A | 4/1999 | Nishiumi et al. |
| 5,577,981 A | 11/1996 | Jarvik | | 5,903,257 A | 5/1999 | Nishiumi et al. |
| 5,580,251 A | 12/1996 | Gilkes et al. | | 5,907,615 A | 5/1999 | Kaschke |
| 5,583,407 A | 12/1996 | Yamaguchi | | 5,912,661 A | 6/1999 | Siddiqui |
| 5,587,937 A | 12/1996 | Massie et al. | | 5,914,705 A | 6/1999 | Johnson et al. |
| 5,589,828 A | 12/1996 | Armstrong | | 5,914,708 A | 6/1999 | LaGrange et al. |
| 5,589,854 A | 12/1996 | Tsai | | 5,917,906 A | 6/1999 | Thornton |
| 5,591,082 A | 1/1997 | Jensen et al. | | 5,929,846 A | 7/1999 | Rosenberg et al. |
| 5,596,347 A | 1/1997 | Robertson et al. | | 5,942,733 A | 8/1999 | Allen et al. |
| 5,600,777 A | 2/1997 | Wang et al. | | 5,943,044 A | 8/1999 | Martinelli et al. |
| 5,619,180 A | 4/1997 | Massimino et al. | | 5,944,151 A | 8/1999 | Jakobs et al. |
| 5,625,576 A | 4/1997 | Massie et al. | | 5,953,413 A | 9/1999 | Peyer et al. |
| 5,629,594 A | 5/1997 | Jacobus et al. | | 5,956,016 A | 9/1999 | Kuenzner et al. |
| 5,638,060 A | 6/1997 | Kataoka et al. | | 5,956,484 A | 9/1999 | Rosenberg et al. |
| 5,642,469 A | 6/1997 | Hannaford et al. | | 5,959,613 A | 9/1999 | Rosenberg et al. |
| 5,643,087 A | 7/1997 | Marcus et al. | | 5,973,689 A | 10/1999 | Gallery |
| 5,656,901 A | 8/1997 | Kurita | | 5,977,867 A | 11/1999 | Blouin |
| 5,666,138 A | 9/1997 | Culver | | 5,982,304 A | 11/1999 | Selker et al. |
| 5,666,473 A | 9/1997 | Wallace | | 5,982,352 A | 11/1999 | Pryor |
| 5,670,755 A | 9/1997 | Kwon | | 5,984,785 A | 11/1999 | Takeda et al. |
| 5,690,582 A | 11/1997 | Ulrich et al. | | 5,986,643 A | 11/1999 | Harvill et al. |
| 5,691,747 A | 11/1997 | Amano | | 5,988,902 A | 11/1999 | Holehan |
| 5,691,898 A | 11/1997 | Rosenberg et al. | | 5,990,869 A | 11/1999 | Kubica et al. |
| 5,694,013 A | 12/1997 | Stewart et al. | | 5,999,168 A | 12/1999 | Rosenberg et al. |
| 5,699,059 A | 12/1997 | Hiller | | 6,001,014 A | 12/1999 | Ogata et al. |
| 5,709,219 A | 1/1998 | Chen et al. | | 6,004,134 A | 12/1999 | Marcus et al. |
| 5,714,978 A | 2/1998 | Yamanaka et al. | | 6,005,551 A | 12/1999 | Osborne et al. |
| 5,719,561 A | 2/1998 | Gonzales | | 6,008,800 A | 12/1999 | Pryor |
| 5,721,566 A | 2/1998 | Rosenberg et al. | | 6,018,711 A | 1/2000 | French-St. George |
| 5,724,106 A | 3/1998 | Autry et al. | | 6,020,876 A | 2/2000 | Rosenberg et al. |
| 5,724,278 A | 3/1998 | Ohgose et al. | | 6,024,576 A | 2/2000 | Bevirt et al. |
| 5,729,249 A | 3/1998 | Yasutake | | 6,028,531 A | 2/2000 | Wanderlich |
| 5,731,804 A | 3/1998 | Rosenberg | | 6,028,593 A | 2/2000 | Rosenberg et al. |
| 5,732,347 A | 3/1998 | Bartle et al. | | 6,037,927 A | 3/2000 | Rosenberg |
| 5,734,373 A | 3/1998 | Rosenberg et al. | | 6,061,004 A | 5/2000 | Rosenberg |
| 5,736,978 A | 4/1998 | Hasser et al. | | 6,067,081 A | 5/2000 | Hahlganss et al. |
| 5,739,811 A | 4/1998 | Rosenberg et al. | | 6,071,194 A | 6/2000 | Sanderson et al. |
| 5,742,278 A | 4/1998 | Chen et al. | | 6,072,475 A | 6/2000 | Van Ketwich et al. |
| 5,745,715 A | 4/1998 | Pickover et al. | | 6,081,536 A | 6/2000 | Gorsuch et al. |
| 5,748,185 A * | 5/1998 | Stephan et al. ............... 345/173 | | 6,084,587 A | 7/2000 | Tarr et al. |
| 5,754,023 A | 5/1998 | Roston et al. | | 6,088,017 A | 7/2000 | Tremblay et al. |
| 5,755,577 A | 5/1998 | Gillio | | 6,088,019 A | 7/2000 | Rosenberg |
| 5,757,358 A | 5/1998 | Osga | | 6,094,565 A | 7/2000 | Alberth et al. |
| 5,760,764 A | 6/1998 | Martinelli | | 6,100,874 A | 8/2000 | Schena et al. |
| 5,766,016 A | 6/1998 | Sinclair | | 6,102,803 A | 8/2000 | Takeda et al. |
| 5,767,457 A | 6/1998 | Gerpheide et al. | | 6,110,130 A | 8/2000 | Kramer |
| 5,767,839 A | 6/1998 | Rosenberg | | 6,111,577 A | 8/2000 | Zilles et al. |
| 5,769,640 A | 6/1998 | Jacobus et al. | | 6,118,435 A * | 9/2000 | Fujita et al. ................... 345/173 |
| 5,771,037 A | 6/1998 | Jackson | | 6,125,264 A | 9/2000 | Watanabe et al. |
| 5,781,172 A | 7/1998 | Engel et al. | | 6,125,385 A | 9/2000 | Wies et al. |
| 5,784,052 A | 7/1998 | Keyson | | 6,128,006 A | 10/2000 | Rosenberg |
| 5,785,630 A | 7/1998 | Bobick et al. | | 6,131,097 A | 10/2000 | Peurach et al. |
| 5,790,108 A | 8/1998 | Salcudean | | 6,140,987 A | 10/2000 | Stein et al. |
| 5,791,992 A | 8/1998 | Crump et al. | | 6,147,422 A | 11/2000 | Delson et al. |
| 5,802,353 A | 9/1998 | Avila et al. | | 6,147,674 A | 11/2000 | Rosenberg et al. |
| 5,804,780 A | 9/1998 | Bartha | | 6,151,332 A | 11/2000 | Gorsuch et al. |
| 5,805,140 A | 9/1998 | Rosenberg et al. | | 6,154,201 A | 11/2000 | Levin et al. |
| 5,805,165 A | 9/1998 | Thorne, III et al. | | 6,160,489 A | 12/2000 | Perry et al. |
| 5,805,416 A | 9/1998 | Friend et al. | | 6,161,126 A | 12/2000 | Wies et al. |
| 5,805,601 A | 9/1998 | Takeda et al. | | 6,166,723 A | 12/2000 | Schena et al. |
| 5,808,601 A | 9/1998 | Leah et al. | | 6,169,540 B1 | 1/2001 | Rosenberg et al. |
| 5,808,603 A | 9/1998 | Chen | | 6,171,191 B1 | 1/2001 | Ogata et al. |
| 5,821,921 A | 10/1998 | Osborn et al. | | 6,178,157 B1 | 1/2001 | Berg et al. |

| Patent | Date | Inventor |
|---|---|---|
| 6,184,868 B1 | 2/2001 | Shahoian |
| 6,198,206 B1 | 3/2001 | Saarmaa et al. |
| 6,215,778 B1 | 4/2001 | Lomp et al. |
| 6,218,966 B1 | 4/2001 | Goodwin et al. |
| 6,219,032 B1 | 4/2001 | Rosenberg et al. |
| 6,219,034 B1 | 4/2001 | Elbing et al. |
| 6,236,647 B1 | 5/2001 | Amalfitano |
| 6,239,790 B1 | 5/2001 | Martinelli et al. |
| 6,243,080 B1 | 6/2001 | Molne |
| 6,262,717 B1 | 7/2001 | Donohue et al. |
| 6,262,718 B1 * | 7/2001 | Findlay et al. ............ 345/178 |
| 6,292,174 B1 | 9/2001 | Mallett et al. |
| 6,300,936 B1 | 10/2001 | Braun et al. |
| 6,307,465 B1 | 10/2001 | Kayama et al. |
| 6,323,846 B1 | 11/2001 | Westerman et al. |
| 6,326,901 B1 | 12/2001 | Gonzales |
| 6,332,075 B1 | 12/2001 | Verdonk |
| 6,337,678 B1 | 1/2002 | Fish |
| 6,359,550 B1 | 3/2002 | Brisebois et al. |
| 6,373,463 B1 | 4/2002 | Beeks |
| 6,388,655 B1 | 5/2002 | Leung |
| 6,388,999 B1 | 5/2002 | Gorsuch et al. |
| 6,411,198 B1 | 6/2002 | Hirai et al. |
| 6,411,276 B1 | 6/2002 | Braun et al. |
| 6,414,674 B1 | 7/2002 | Kamper et al. |
| 6,415,138 B2 | 7/2002 | Sirola et al. |
| 6,418,323 B1 | 7/2002 | Bright et al. |
| 6,422,941 B1 | 7/2002 | Thorner et al. |
| 6,424,356 B2 | 7/2002 | Chang et al. |
| 6,429,846 B2 | 8/2002 | Rosenberg et al. |
| 6,435,794 B1 | 8/2002 | Springer |
| 6,438,390 B1 | 8/2002 | Awan |
| 6,438,392 B1 | 8/2002 | Toba |
| 6,441,599 B1 | 8/2002 | Kropidlowski |
| 6,445,284 B1 | 9/2002 | Cruz-Hernandez et al. |
| 6,447,069 B1 | 9/2002 | Terris et al. |
| 6,448,977 B1 | 9/2002 | Braun et al. |
| 6,469,695 B1 | 10/2002 | White |
| 6,473,069 B1 | 10/2002 | Gerpheide |
| 6,487,421 B2 | 11/2002 | Hess et al. |
| 6,509,892 B1 | 1/2003 | Kamper et al. |
| 6,518,958 B1 | 2/2003 | Miyajima et al. |
| 6,529,122 B1 | 3/2003 | Magnussen et al. |
| 6,535,201 B1 | 3/2003 | Cooper et al. |
| 6,563,487 B2 | 5/2003 | Martin |
| 6,574,489 B1 | 6/2003 | Uriya |
| 6,606,508 B2 | 8/2003 | Becker et al. |
| 6,610,936 B2 | 8/2003 | Gillespie et al. |
| 6,626,358 B1 | 9/2003 | Breimesser et al. |
| 6,628,195 B1 | 9/2003 | Coudon |
| 6,636,197 B1 | 10/2003 | Goldenberg et al. |
| 6,636,202 B2 | 10/2003 | Ishmael, Jr. et al. |
| 6,639,581 B1 | 10/2003 | Moore |
| 6,639,582 B1 | 10/2003 | Shrader |
| 6,647,145 B1 | 11/2003 | Gay |
| 6,671,618 B2 | 12/2003 | Hoisko |
| 6,680,729 B1 | 1/2004 | Shahoin et al. |
| 6,690,955 B1 | 2/2004 | Komiyama |
| 6,697,043 B1 | 2/2004 | Shahoian |
| 6,710,518 B2 | 3/2004 | Morton et al. |
| 6,723,937 B2 | 4/2004 | Englemann et al. |
| 6,727,916 B1 | 4/2004 | Ballard |
| 6,792,294 B1 | 9/2004 | Kushita |
| 6,819,922 B1 | 11/2004 | Janz |
| 6,822,635 B2 | 11/2004 | Shahoian et al. |
| 6,834,373 B2 | 12/2004 | Dieberger |
| 6,850,150 B1 | 2/2005 | Ronkainen |
| 6,850,781 B2 | 2/2005 | Goto |
| 6,859,819 B1 | 2/2005 | Rosenberg et al. |
| 6,876,847 B2 | 4/2005 | Kudoh |
| 6,882,713 B2 | 4/2005 | Sakai et al. |
| 6,885,876 B2 | 4/2005 | Aaltonen et al. |
| 6,940,497 B2 | 9/2005 | Vincent et al. |
| 6,944,482 B2 | 9/2005 | Engstrom et al. |
| 6,963,839 B1 | 11/2005 | Ostermann et al. |
| 6,982,696 B1 | 1/2006 | Shahoian |
| 7,009,595 B2 | 3/2006 | Roberts et al. |
| 7,061,466 B1 | 6/2006 | Moore |
| 7,096,045 B2 | 8/2006 | Yoshinaga |
| 7,103,389 B2 | 9/2006 | Shibata |
| 7,113,177 B2 | 9/2006 | Franzen |
| 7,127,271 B1 | 10/2006 | Fujisaki |
| 7,149,208 B2 | 12/2006 | Mattaway et al. |
| 7,151,528 B2 | 12/2006 | Taylor et al. |
| 7,171,191 B2 | 1/2007 | Olson |
| 7,184,765 B1 | 2/2007 | Birnie et al. |
| 7,215,329 B2 | 5/2007 | Yoshikawa et al. |
| 7,218,310 B2 | 5/2007 | Tierling et al. |
| 7,225,000 B2 | 5/2007 | Katayanagi |
| 7,289,796 B2 | 10/2007 | Kudoh |
| 7,292,227 B2 | 11/2007 | Fukumoto et al. |
| 7,312,790 B2 | 12/2007 | Sato et al. |
| 7,328,020 B2 | 2/2008 | Masuda et al. |
| 7,336,977 B2 | 2/2008 | Katayanagi |
| 7,369,115 B2 | 5/2008 | Cruz-Hernandez et al. |
| 7,373,120 B2 | 5/2008 | Messel et al. |
| 7,424,272 B2 | 9/2008 | Horiguchi |
| 7,450,110 B2 | 11/2008 | Shahoian et al. |
| 7,463,249 B2 | 12/2008 | Knowles et al. |
| 7,533,342 B1 | 5/2009 | Vialle et al. |
| 7,548,232 B2 | 6/2009 | Shahoian et al. |
| 2001/0036832 A1 | 11/2001 | McKay |
| 2001/0044328 A1 | 11/2001 | Tsukamoto |
| 2002/0012323 A1 | 1/2002 | Petite et al. |
| 2002/0039914 A1 | 4/2002 | Hama et al. |
| 2002/0044155 A1 | 4/2002 | Becker |
| 2002/0107936 A1 | 8/2002 | Amon |
| 2002/0111737 A1 | 8/2002 | Hoisko |
| 2002/0130904 A1 | 9/2002 | Becker et al. |
| 2002/0177471 A1 | 11/2002 | Kaaresoja |
| 2002/0193125 A1 | 12/2002 | Smith |
| 2002/0194246 A1 | 12/2002 | Moskowitz et al. |
| 2003/0002682 A1 | 1/2003 | Smith et al. |
| 2003/0006892 A1 | 1/2003 | Church |
| 2003/0016211 A1 | 1/2003 | Woolley |
| 2003/0022701 A1 | 1/2003 | Gupta |
| 2003/0038776 A1 | 2/2003 | Rosenberg et al. |
| 2003/0045266 A1 | 3/2003 | Staskal et al. |
| 2003/0048260 A1 | 3/2003 | Matusis |
| 2003/0058265 A1 | 3/2003 | Robinson et al. |
| 2003/0067440 A1 | 4/2003 | Rank |
| 2003/0071795 A1 | 4/2003 | Baldauf et al. |
| 2003/0076298 A1 | 4/2003 | Rosenberg |
| 2003/0078071 A1 | 4/2003 | Uchiyama |
| 2003/0095105 A1 | 5/2003 | Vaananen |
| 2003/0122779 A1 | 7/2003 | Martin et al. |
| 2003/0128191 A1 | 7/2003 | Strasser et al. |
| 2003/0128192 A1 | 7/2003 | van Os |
| 2003/0174121 A1 | 9/2003 | Poupyrev et al. |
| 2003/0184574 A1 | 10/2003 | Phillips et al. |
| 2003/0236729 A1 | 12/2003 | Epstein et al. |
| 2004/0059790 A1 | 3/2004 | Austin-Lane |
| 2004/0067780 A1 | 4/2004 | Eiden |
| 2004/0075676 A1 | 4/2004 | Rosenberg et al. |
| 2004/0203656 A1 | 10/2004 | Andrew et al. |
| 2004/0204049 A1 | 10/2004 | Hsu et al. |
| 2005/0134561 A1 | 6/2005 | Tierling et al. |
| 2006/0248183 A1 | 11/2006 | Barton |
| 2007/0299478 A1 | 12/2007 | Casavant et al. |
| 2008/0068350 A1 | 3/2008 | Rosenberg et al. |

FOREIGN PATENT DOCUMENTS

| | | |
|---|---|---|
| EP | 0062664 | 10/1982 |
| EP | 0085518 | 10/1983 |
| EP | 0265011 | 4/1988 |
| EP | 0349086 | 1/1990 |
| EP | 0607580 | 7/1994 |
| EP | 0626634 | 11/1994 |
| EP | 0556999 B1 | 5/1998 |
| EP | 0875819 | 11/1998 |
| EP | 1182851 | 2/2002 |
| JP | 63-164127 | 10/1988 |
| JP | 01-003664 | 7/1990 |
| JP | 02-109714 | 1/1992 |
| JP | 05-020226 | 3/1993 |
| JP | 04-007371 | 8/1993 |
| JP | 6-18341 | 1/1994 |
| JP | 06-139018 | 5/1994 |

| | | |
|---|---|---|
| JP | 06-265991 | 9/1994 |
| JP | 05-193862 | 1/1995 |
| JP | 07-064723 | 3/1995 |
| JP | 07-113703 | 5/1995 |
| JP | 07-266263 | 10/1995 |
| JP | 2511577 | 7/1996 |
| JP | 11-085400 | 3/1999 |
| JP | 11-299305 | 11/1999 |
| JP | 11-338629 | 12/1999 |
| JP | 2001-350592 | 12/2001 |
| JP | 2002-259059 A | 9/2002 |
| WO | WO 92-00559 A1 | 1/1992 |
| WO | WO 95/20788 A1 | 8/1995 |
| WO | WO 95/32459 | 11/1995 |
| WO | WO 96/28777 | 9/1996 |
| WO | WO 97/21160 | 1/1997 |
| WO | WO 97/12357 | 4/1997 |
| WO | WO 97/18546 | 5/1997 |
| WO | WO 97/20305 | 6/1997 |
| WO | WO 97/31333 | 8/1997 |
| WO | WO 98/08159 | 2/1998 |
| WO | WO 98/24183 | 6/1998 |
| WO | WO 98/58323 | 12/1998 |
| WO | WO 99/40504 | 8/1999 |
| WO | WO 00/03319 | 1/2000 |
| WO | WO 00/21071 | 4/2000 |
| WO | WO 00/41788 | 7/2000 |
| WO | WO 02/03172 | 1/2002 |
| WO | WO 02/12991 | 2/2002 |
| WO | WO 02/27645 | 4/2002 |
| WO | WO 02/31807 | 4/2002 |
| WO | WO 02/059869 | 8/2002 |
| WO | WO 02/078810 | 10/2002 |
| WO | WO 2004/052193 | 6/2004 |
| WO | WO 2004/053644 | 6/2004 |
| WO | WO 2004/053671 | 6/2004 |
| WO | WO 2004/053829 | 6/2004 |
| WO | WO 2004/053830 | 6/2004 |

OTHER PUBLICATIONS

Adelstein, "A Virtual Environment System for the Study of Human Arm Tremor," Ph.D. Dissertation, Dept. Of Mechanical Engineering, MIT, Jun. 1989.

Adelstein, "Design and Implementation of a Force Reflecting Manipulandum for Manual Control research," DSC-vol. 42, Advances in Robotics, Edited by H. Kazerooni, pp. 1-12, 1992.

Adelstein, et al., "A High Performance Two-Degree-of-Freedom Kinesthetic Interface," MIT, 1992, pp. 108-112.

Akamatsu et al., "Multimodal Mouse: A Mouse-Type Device with Tactile and Force Display," 1994, Presence vol. 3, pp. 73-80.

Atkinson et al., "Computing with Feeling,", Comput. & Graphics, vol. 2, 1977, pp. 97-103.

Aukstakalnis et al., "Silicon Mirage: The Art and Science of Virtual Reality," ISBN 0-938151-82-7, pp. 129-180, 1992.

Baigrie, "Electric Control Loading—A Low Cost, High Performance Alternative," Proceedings, pp. 247-254, Nov. 6-8, 1990.

Batter et al., "Grope-1: A computer Display to the sense of Feel," Proc IFIP Congress, 1971, pp. 759-763.

Bejczy, "Generalization of Bilateral Force-Reflecting Control of Manipulators," Proceedings of Fourth CISM-IFToMM, Sep. 8-12, 1981.

Bejczy, "Sensors, Controls, and Man-Machine Interface for Advanced Teleoperation," Science, vol. 208, No. 4450, pp. 1327-1335, 1980.

Bejczy et al., "A Laboratory Breadboard System for Dual-Arm Teleoperation," SOAR '89 Workshop, JSC, Houston, TX, Jul. 25-27, 1989.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, et al., "Universal Computer Control System (UCCS) For Space Telerobots," CH2413-3/87/0000/0318501.00 1987 IEEE.

Bejezy et al., "The Phantom Robot: Predictive Displays for Teleoperation with Time Delay," IEEE CH2876, Jan. 1990, pp. 546-550.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Brooks, Jr. et al., "Project GROPE, Haptic Displays for Scientific Visualization,", Computer Graphics, vol. 24, #4, 1990, pp. 177-184.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Buttolo et al., "Pen-based force Display for Precision Manipulation in Virtual Environments," IEEE 0-8186-7084-3, 1995, pp. 217-224.

Calder, "Design of a Force-Feedback Touch-Introducing Actuator for Teleoperator Robot Control," Bachelor of Science Thesis, MIT, Jun. 23, 1983.

Caldwell et al., "Enhanced Tactile Feedback (Tele-Taction) Using a Multi-Functional Sensory System," 1050-4729/93, pp. 955-960, 1993.

Chang "Audio-Haptic Feedback in Mobile Phones", Proceedings of AMC CHI 2005 Conference on Human Factors in Computing Systems, Apr. 2-7, 2005, Portland, Oregon, pp. 1264-1267, 2005.

Colgate et al., "Implementation of Stiff Virtual Walls in Force-Reflecting Interfaces," Northwestern University, IL, 1993., pp. 1-8.

Dennerlein et al., "Vibrotactile Feedback for Industrial Telemanipulators," 1997, Sixth Annual Symp. On Haptic Interfaces for Virtual Env. And Teleoperator Systems, ASME IMECE, Dallas, pp. 1-7.

Dennerlein, Jack et al., "Commercialization of Vibrotactile Feedback for Telemanipulation and Virtual Environments," 1997, Phase I Final Report for ONR Contract N00014-96-C-0325 (not published or publicly available).

Ellis et al., Design & Evaluation of a High-Performance Prototype Planar Haptic Interface, Dec. 1993, Advances in Robotics, 55-64.

Erikson, Carl "Polygonal Simplificatin: An Overview", Dept. Of Computer Science, TR96-016 1996, pp. 1-32.

Fischer, et al., "Specification and Design of Input Devices for Teleoperation," IEEE CH2876, Jan. 1990, pp. 540-545.

Fokumoto, "Active Click: Tactile Feedback for Touch Panels," ACM CHI2001 Extended Abstracts, pp. 121-122, Apr. 2001.

Fukuhara et al, Voice Café: Conversation Support System in a Gourp, 2001, IOS Press, pp. 334 and 335.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Gotow et al., "Perception of Mechanical Properties at the Man—Machine Interface," IEEE CH2503-1, 1987, pp. 688-690.

Hannaford et al., "Force-Feedback Cursor Control," NASA Tech Briefs, vol. 13, No. 11, 1989, pp. 1-7.

Hannaford et al., "Performance Evaluation of a 6-Axis Generalized Force-Reflecting Teleoperator," IEEE Transactions on Systems, Man, and Cybernetics, vol. 21, No. 3, 1991, pp. 621-623, 631-633.

Hardman, Lynda et al "Do You Have the Time? Composition and Linking in Time-based Hypermedia", Proceedings of the 10th ACM Conference of Hypertext and Hypermedia, Feb. 1999, pp. 189-196.

Hasser, C., "Tactile Feedback for a Force-Reflecting Haptic Display," School of Eng., Univ. Of Dayton, Dayton, OH, 1995, pp. 1-98.

Hasser, C. et al., "Tactile Feedback with Adaptive Controller for a Force-Reflecting Haptic Display," Parts 1 and 2, IEEE 0-7803-3131-1, 1996, pp. 526-533.

Hirota et al., "Development of Surface Display," IEEE 0-7803-1363-1, 1993, pp. 256-262.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

Howe et al., "Task Performance w/ a dextrous Teleoperated Hand System," Proc. of SPIE, vol. 1833, 1992, pp. 1-9.

IBM Technical Disclosure Bulletin, "Mouse Ball-Actuating Device With Force and Tactile Feedback," vol. 32, No. 9B, Feb. 1990.

Iwata, "Pen-based Haptic Virtual Environment," 0-7803-1363-1/93 IEEE, pp. 287-292, 1993.

Iwata, Hiroo, "Artificial Reality with Force-feedback: Development of Desktop Virtual Space with Compact Master Manipulator," Computer Graphics, vol. 24, No. 4, Aug. 1990, pp. 165-170.

Jacobsen et al., "High Performance, Dextrous Telerobotic Manipulator With Force Reflection," InterventiorVROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kelley et al., "MagicMouse: Tactile and Kinesthetic Feedback in the Human—Computer Interface using an Electromagnetically Actuated Input/Output Device," Oct. 19, 1993 University of British Columbia pp. 1-27.

Kelley et al., "On the Development of a Force-Feedback Mouse and its Integration into a graphical user Interface," Nov. 1994, Engineering Congress and Exhibition, pp. 1-8.

Kilpatrick et al., "The Use of Kinesthetic Supplement in an Interactive Graphics System," University of North Carolina, 1976, pp. 1-172.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Kontarinis et al., "Tactile Display of Vibratory Information in Teleoperation and Virtual Environments," Presence, 4(4):387-402, 1995.

Kotoku, "A Predictive Display with Force Feedback and its Application to Remote Manipulation System with Transmission Time Delay," Proc. of IEEE/RSJ Intl Conf. On Intelligent Robots and Systems, Jul. 1992.

Kotoku, et al., "Environment Modeling for the Interactive Display (EMID) Used in Telerobotic Systems," IEEE/RSJ Int'l Workshop on Intelligent Robots and Systems, Nov. 1991, pp. 999-1004.

Lake, "Cyberman from Logitech," GameBytes, 1994.

"Cyberman Technical Specification," Logitech Cyberman SWIFT Supplement, Apr. 5, 1994. cited by other.

MacLean, Karon et al "An Architecture for Haptic Control of Media," in: The Proceedings of the ASMA Dynamic SySTEMS and Control Division: 1999 International Mechanical Engineering Congress and Exposition, Eighth Annual Symposium on Haptic Interfaces for Virtual Environment and Teleoperator Systems, Nov. 14-19, 1999, pp. 1-10.

Marcus, "Touch Feedback in Surgery," Proceedings of Virtual Reality and Medicine the Cutting Edge, Sep. 8-11, 1994.

McAffee et al, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Millman et al., "Design of a 4 Degree of Freedom Force-Reflecting Manipulandum with a Specified Force/Torque Workspace," IEEE CH2969-4, 1991, pp. 1488-1493.

Minsky, "Computational Haptics: The Sandpaper System for Synthesizing Texture for a Force-Feedback Display," Ph.D. Dissertation, MIT, Jun. 1995.

Minsky et al., "Feeling & Seeing:Issues in Force Display," ACM089791-351-5, 1990, pp. 235-242, 270.

Munch et al., "Intelligent Control for Haptic Displays," Eurographics '96, vol. 15, No. 3, 1996, pp. 217-226.

Noll, "Man-Machine Tactile," SID Journal, Jul./Aug. 1972 Issue.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Ouh-Young et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh-Young et al., "Creating an Illusion of Feel: Control Issues in Force Display," Univ. of N. Carolina, 1989, pp. 1-14.

Ouh-Young, et al., Using a Manipulator for Force Display in Molecular Docking, IEEE CH2555, 1988, pp. 1824-1829.

Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Patrick, "Design, Construction, and Testing of a Fingertip Tactile Display for Interaction with Virtual and Remote Environments," Master of Science Thesis, MIT, Nov. 8, 1990.

Payette et al., "Evaluation of a Force Feedback (Haptic) Computer Printing Device in Zero Gravity," Oct. 17, 1996, ASME Dynamics Systems, vol. 58 pp. 547-553.

Pimentel et al., "Virtual Reality: through the new looking glass," 2nd Edition; McGraw-Hill, ISBN 0-07-050167-X, pp. 41-202, 1994.

Ramstein et al., "The Pantograph: A Large Workspace Haptic Device for a Multimodal Human—Computer Interaction," Computer—Human Interaction, CHI 1994, pp. 1-3.

Rosenberg, "Virtual Fixtures: Perceptual Overlays Enhance Operator Performance in Telepresence Tasks," Ph.D. Dissertation, Stanford University, Jun. 1994.

Rosenberg, L., "Virtual fixtures as tools to enhance operator performance in telepresence environments," SPIE Manipulator Technology, 1993, pp. 1-12.

Rosenberg et al., "A Force Feedback Programming Primer," Immersion Corp., 1997, pp. 1-176.

Rosenberg et al., "Commercially Viable force feedback Controller for Individuals with Neuromotor Disabilities," Armstrong Laboratory, AL/CF-TR-1997-0016, 1996, pp. 1-33.

Rosenberg et al., "Perceptual Decomposition of Virtual Haptic Surfaces," Proc. IEEE Symposium on Research Frontiers in Virtual Reality, 1993, pp. 1-8.

Rosenberg et al., "The use of force feedback to enhance graphical user interfaces," Stereoscopic Displays & Virtual Reality Systems, 1996, pp. 243-248.

Rosenberg, "Perceptual Design of a Virtual Rigid Surface Contact," Armstrong Laboratory AL/CF-TR-1995-0029, 1993, pp. 1-45.

Rosenberg, "Virtual Haptic Overlays Enhance Performance in Telepresence Tasks," Dept. of Mech. Eng., Stanford Univ., 1994.

Rosenberg, et al., "The Use of Force Feedback to Enhance Graphical User Interfaces," Proc. SPIE 2653, 1996, pp. 243-248.

Russo, "Controlling Dissipative Magnetic Particle Brakes in Force Reflective Devices," DSC-vol. 42, Advances in Robotics, pp. 63-70, ASME 1992.

Russo, "The Design and Implementation of a Three Degree of Freedom Force Output Joystick," MIT Libraries Archives Aug. 14, 1990, pp. 1-131, May 1990.

Scannell, "Taking a Joystick Ride," Computer Currents, Boston Edition, vol. 9, No. 11, Nov. 1994.

Schmult et al., "Application Areas for a Force-Feedback Joystick," 1993, Advances in Robotics, vol. 49, pp. 47-54.

"Component Maintenance Manual with Illustrated Parts List, Coaxial Shaker Part No. C-25502", Safe Flight Instrument Corporation, Revised Jan. 28, 2002 (3 pages.).

"Technical Manual Overhaul Instructions With Parts Breakdown, Coaxial Control Shaker Part No. C-25502", Safe Flight Instrument Corporation, revised Jul. 15, 1980 (23 pages).

Safe Flight Instruments Corporation, "Coaxial Control Shaker," Part No. C-25502, Jul. 1, 1967.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Force Feedback Touch Panel, Represented by CSC Division, Sales Department, SIXIK Corporation, Tokyo, Japan, www.smk.co.jp. cited by other.

SMK Corporation, "Force Feedback Type Optical Touch Panel Developed," SMK Corporation Website, Oct. 30, 2002.

Definition of "avatar", 2001, Hargrave's Communications Dictionary.

Bliss, James C., "Optical-to-tactile Image Conversion for the Blind," IEEE Transactions on Man-Machine Systems, vol. MMS-11, No. 1, 1970, pp. 58-65.

Bolanowski, S.J. et al., "Four Channels Mediate the Mechanical Aspects of Touch," J. Acoust. Soc. Am. 84 vol. 84 (5), Nov. 1988, pp. 1680-1694.

Durlach, Nathaniel I. et al., "Virtual Reality: Scientific and Technological Challenges," National Academy Press, Washington, D. C. 1995, pp. 160-205.

Eberhardt, Silvio P. et al., "OMAR—A Haptic Display for Speech Perception by Deaf and Deaf- Blind Individuals," IEEE 1993, pp. 195-201.

Eberhardt, Silvio P. et al., "Inducing Dynamic Haptic Perception by the Hand: System Description and Some Results," Proceedings of ASME Dynamic Systems and Control, vol. DSC-55-1, No. 1, 1994, pp. 345-351.

Frisken-Gibson, Sarah F. et al, "A 64-Solenoid, Four-Level Fingertip Search Display for the Blind," IEEE Transactions on Biomedical Engineering, vol. BME-34, No. 12, Dec. 1987, pp. 963-965.

Goldstein, Moise H. et al., "Tactile Aids for the Profoundly Deaf Child," 77 J. Acoust. Soc. Am 77 (1), Jan. 1985, pp. 258-265.

International Preliminary Report on Patentability, Application No. PCT/US2005/036861, dated Apr. 11, 2007.

International Search Report, Application No. PCT/US2005/036861, dated Feb. 23, 2006.

Jackson, K. M., "Linearity of Radio-Frequency Transducers," Medical and Biological Engineering and Computer, Jul. 1977, pp. 446-449.

Johnson, David A., "Shape-Memory Alloy Tactical Feedback Actuator," Tini Allow Company, Inc., Aug. 1990, 2 pages, pp. i-33.

Kaczmarek, Kurt A. et al, "Electrotactile and Vibrotactile Displays for Sensory Substitution Systems", IEEE Transactions on Biomedical Engineering, vol. 38, No. 1, Jan. 1991, pp. 1-16.

Kaczmarek, K. A. et al. "Tactile Displays," in: Virtual Environments and Advanced Interface Design, New York: Oxford University Press, 1995, pp. 349-414.

Peine, W.J., "Tactile Shape Displays for Small Scale Shape Feedback," http://www.hrl.harvard.edu/~peine/display.html, 1998, pp. 1-2.

Rabinowitz, W.M. et al., "Multidimensional Tactile Displays: Identification of Vibratory Intensity, Frequency, and Contactor Area," J. Acoust. Soc. Am. 82 (4), Oct. 1987, pp. 1243-1252.

Ramstein, Christophe, "Combining Haptic and Braille Technologies: Design Issues and Pilot Study," Assets '96, 2nd Annual ACM Conference on Assistive Technologies, ACM SIGRAPH, Apr. 1996, pp. 37-44.

Wiker, Steven F., "Teletouch Display Development: Phase 1 Report," Naval Ocean Systems Center, Technical Report 1230, Jul. 1988, 66 pages.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting, 1991, pp. 708-712.

\* cited by examiner

HAPTIC FEEDBACK FOR TOUCHPADS AND OTHER TOUCH CONTROLS

CROSS REFERENCE TO RELATED APPLICATIONS

This application is a continuation of U.S. patent application Ser. No. 11/405,811 entitled "Haptic Feedback for Touchpads and Other Touch Controls," filed Apr. 17, 2006, which is a continuation of U.S. Pat. No. 7,148,875, entitled "Haptic Feedback for Touchpads and Other Touch Controls," issued Dec. 12, 2006, which is a continuation of U.S. Pat. No. 6,429,846, entitled "Haptic Feedback for Touchpads and Other Touch Controls," issued Aug. 6, 2002, which is a continuation-in-part of U.S. Pat. No. 6,563,487, entitled "Haptic Feedback for Directional Control Pads," issued May 13, 2003, which is a continuation-in-part of U.S. Pat. No. 6,243,078, entitled "Low Cost Force Feedback Pointing Device," issued Jun. 5, 2001, which is a continuation-in-part of U.S. Pat. No. 6,184,868, entitled "Haptic Feedback Control Devices," issued Feb. 6, 2001, which is a continuation-in-part of U.S. Pat. No. 6,088,019, entitled "Low Cost Force Feedback Device with Actuator for Non-Primary Axis," issued Jul. 11, 2000.

BACKGROUND

The subject matter described relates generally to the interfacing with computer and mechanical devices by a user, and more particularly to devices used to interface with computer systems and electronic devices and which provide haptic feedback to the user.

Humans interface with electronic and mechanical devices in a variety of applications, and the need for a more natural, easy-to-use, and informative interface is a constant concern. In the context, humans interface with computer devices for a variety of applications. One such application is interacting with computer-generated environments such as games, simulations, and application programs. Computer input devices such as mice and trackballs are often used to control a cursor within a graphical environment and provide input in these applications.

In some interface devices, force feedback or tactile feedback is also provided to the user, collectively known herein as "haptic feedback." For example, haptic versions of joysticks, mice, gamepads, steering wheels, or other types of devices can output forces to the user based on events or interactions occurring within the graphical environment, such as in a game or other application program.

In portable computer or electronic devices, such as laptop computers, mice typically too large a workspace to be practical. As a result, more compact devices such as trackballs are often used. A more popular device for portable computers are "touchpads," which are small rectangular, planar pads provided near the keyboard of the computer. The touchpads senses the location of a pointing object by any of a variety of sensing technologies, such as capacitive sensors or pressure sensors that detect pressure applied to the touchpad. The user contacts the touchpad most commonly with a fingertip and moves his or her finger on the pad to move a cursor displayed in the graphical environment. In other embodiments, the user can operate a stylus in conjunction with the touchpad by pressing the stylus tip on the touchpad and moving the stylus.

One problem with existing touchpads is that there is no haptic feedback provided to the user. The user of a touchpad is therefore not able to experience haptic sensations that assist and inform the user of targeting and other control tasks within the graphical environment. The touchpads of the prior art also cannot take advantage of existing haptic-enabled software run on the portable computer.

OVERVIEW

An embodiment is directed to a haptic feedback planar touch control used to provide input to a computer system. The control can be a touchpad provided on a portable computer, or can be a touch screen found on a variety of devices. The haptic sensations output on the touch control enhance interactions and manipulations in a displayed graphical environment or when controlling an electronic device.

More specifically, the embodiment relates to a haptic feedback touch control for inputting signals to a computer and for outputting forces to a user of the touch control. The control includes a touch input device including an approximately planar touch surface operative to input a position signal to a processor of said computer based on a location of user contact on the touch surface. The computer positions a cursor in a graphical environment displayed on a display device based at least in part on the position signal. At least one actuator is also coupled to the touch input device and outputs a force on the touch input device to provide a haptic sensation to the user contacting the touch surface. The actuator outputs the force based on force information output by the processor to the actuator.

The touch input device can be a touchpad separate from a display screen of the computer, or can be included in a display screen of the computer as a touch screen. The touch input device can be integrated in a housing of the computer or handheld device, or provided in a housing that is separate from the computer. The user contacts the touch surface with a finger, a stylus, or other object. The force is preferably a linear force output approximately perpendicularly to a plane of the touch surface of the touch input device, and the actuator can include a piezo-electric actuator, a voice coil actuator, a pager motor, a solenoid, or other type of actuator. In one embodiment, the actuator is coupled between the touch input device and a grounded surface. In another embodiment, the actuator is coupled to an inertial mass, wherein said actuator outputs an inertial force on the touch input device approximately along an axis perpendicular to the planar touch surface. A touch device microprocessor separate from the main processor of the computer can receive force information from the host computer and provide control signals based on the force information to control the actuator.

The haptic sensations, such as a pulse, vibration, or spatial texture, are preferably output in accordance with an interaction of a controlled cursor with a graphical object in the graphical environment. For example, a pulse can be output when the cursor is moved between menu elements in a menu, moved over said icon, or moved over a hyperlink. The touch input device can include multiple different regions, where at least one of the regions provides the position signal and at least one other region provides a signal that is used by the computer to control a different function, such as rate control function of a value or a button press. Different regions and borders between regions can be associated with different haptic sensations.

An embodiment advantageously provides haptic feedback to a planar touch control device of a computer, such as a touchpad or touch screen. The haptic feedback can assist and inform the user of interactions and events within a graphical user interface or other environment and ease cursor targeting tasks. Furthermore, an embodiment allows portable computer devices having such touch controls to take advantage of existing haptic feedback enabled software. The haptic touch devices disclosed herein are also inexpensive, compact and consume low power, allowing them to be easily incorporated into a wide variety of portable and desktop computers and electronic devices.

These and other advantages will become apparent to those skilled in the art upon a reading of the following specification and a study of the several figures of the drawing.

DETAILED DESCRIPTION

Figure 1:
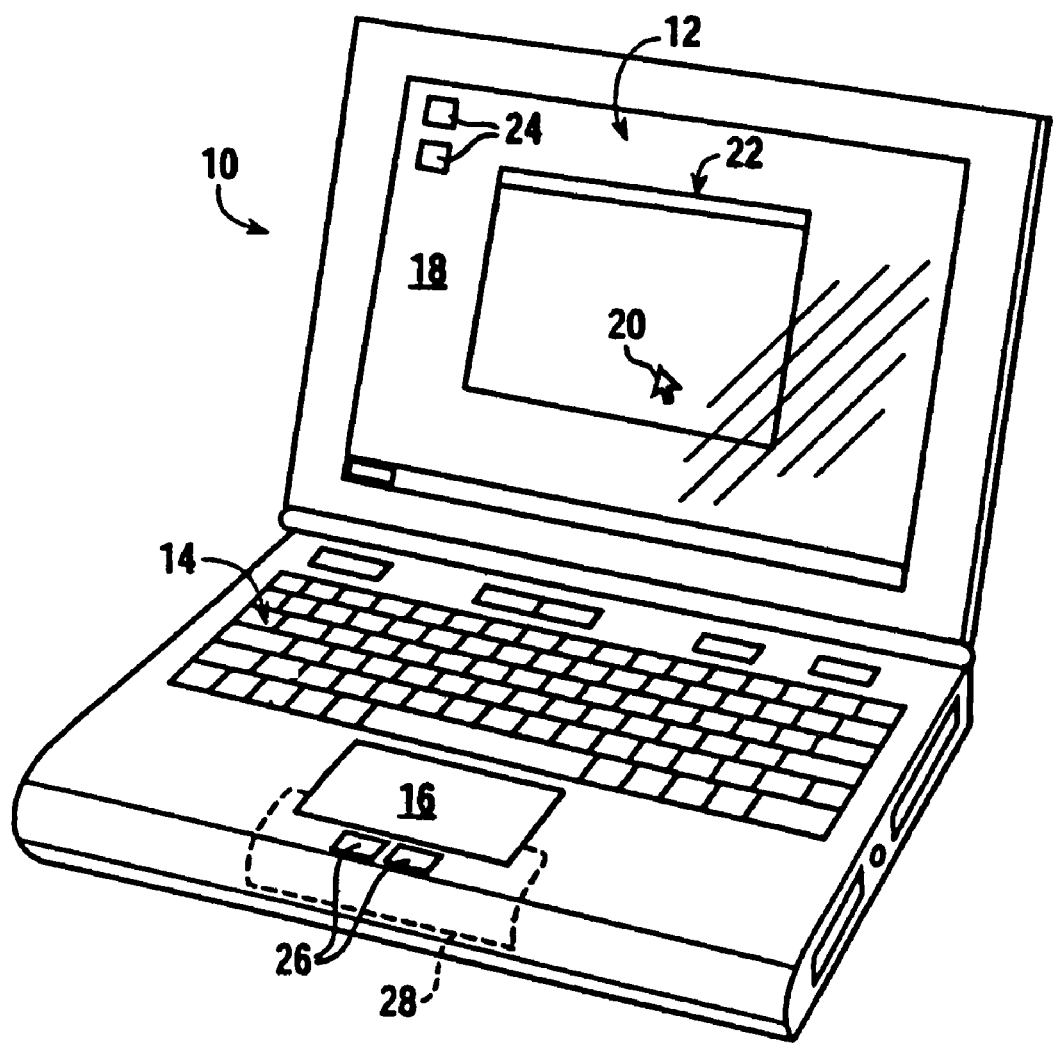
FIG. 1 is a perspective view of a haptic touchpad.

FIG. 1 is a perspective view of a portable computer 10 including a haptic touchpad. Computer 10 is preferably a portable or "laptop" computer that can be carried or otherwise transported by the user and may be powered by batteries or other portable energy source in addition to other more stationary power sources. Computer 10 preferably runs one or more host application programs with which a user is interacting via peripherals.

Computer 10 may include the various input and output devices as shown, including a display device 12 for outputting graphical images to the user, a keyboard 14 for providing character or toggle input from the user to the computer, and a touchpad 16. Display device 12 can be any of a variety of types of display devices; flat-panel displays are most common on portable computers. Display device 12 can display a graphical environment 18 based on application programs and/or operating systems that are running, such as a graphical user interface (GUI), that can include a cursor 20 that can be moved by user input, as well as windows 22, icons 24, and other graphical objects well known in GUI environments. Other devices may also be incorporated or coupled to the computer 10, such as storage devices (hard disk drive, DVD-ROM drive, etc.), network server or clients, game controllers, etc. In alternate embodiments, the computer 10 can take a wide variety of forms, including computing devices that rest on a tabletop or other surface, stand-up arcade game machines, other portable devices or devices worn on the person, handheld or used with a single hand of the user, etc. For example, host computer 10 can be a video game console, personal computer, workstation, a television "set top box" or a "network computer", or other computing or electronic device.

Touchpad device 16 preferably appears externally to be similar to the touchpads of the prior art. Pad 16 includes a planar, rectangular smooth surface that can be positioned below the keyboard 14 on the housing of the computer 10, as shown, or may be positioned at other areas of the housing. When the user operates the computer 10, the user may conveniently place a fingertip or other object on the touchpad 16 and move the fingertip to correspondingly move cursor 20 in the graphical environment 18.

In operation, the touchpad 16 inputs coordinate data to the main microprocessor(s) of the computer 10 based on the sensed location of an object on (or near) the touchpad. As with many touchpads of the prior art, touchpad 16 can be capacitive, resistive, or use a different type of sensing. Some existing touchpad embodiments are disclosed, for example, in U.S. Pat. No. 5,521,336 and U.S. Pat. No. 5,943,044. Capacitive touchpads typically sense the location of an object on or near the surface of the touchpad based on capacitive coupling between capacitors in the touchpad and the object. Resistive touchpads are typically pressure-sensitive, detecting the pressure of a finger, stylus, or other object against the pad, where the pressure causes conductive layers, traces, switches, etc. in the pad to electrically connect. Some resistive or other types of touchpads can detect the amount of pressure applied by the user and can use the degree of pressure for proportional or variable input to the computer 10. Resistive touchpads typically are at least partially deformable, so that when a pressure is applied to a particular location, the conductors at that location are brought into electrical contact. Such deformability can be useful since it can potentially amplify the magnitude of output forces such as pulses or vibrations on the touchpad. Forces can be amplified if a tuned compliant suspension is provided between an actuator and the object that is moved, as described in U.S. Pat. No. 6,680,729. Capacitive touchpads and other types of touchpads that do not require significant contact pressure may be better suited in many embodiments, since excessive pressure on the touchpad may in some cases interfere with the motion of the touchpad for haptic feedback. Other types of sensing technologies can also be used in the touchpad. Herein, the term "touchpad" preferably includes the surface of the touchpad 16 as well as any sensing apparatus included in the touchpad unit.

Touchpad 16 preferably operates similarly to existing touchpads, where the speed of the fingertip on the touchpad correlates to the distance that the cursor is moved in the graphical environment. For example, if the user moves his or her finger quickly across the pad, the cursor is moved a greater distance than if the user moves the fingertip more slowly. If the user's finger reaches the edge of the touchpad before the cursor reaches a desired destination in that direction, then the user can simply move his or her finger off the touchpad, reposition the finger away from the edge, and continue moving the cursor. This is an "indexing" function similar to lifting a mouse off a surface to change the offset between mouse position and cursor. Furthermore, many touchpads can be provided with particular regions that are each assigned to particular functions that can be unrelated to cursor positioning. Such an embodiment is described in greater detail below with respect to FIG. 7. In some embodiments the touchpad 16 may also allow a user to "tap" the touchpad (rapidly touch and remove the object from the pad) in a particular location to provide a command. For example, the user can tap or "double tap" the pad with a finger while the controlled cursor is over an icon to select that icon.

The touchpad 16 is provided with the ability to output haptic feedback such as tactile sensations to the user who is physically contacting the touchpad 16. Various embodiments detailing the structure of the haptic feedback touchpad are described in greater detail below. Preferably, the forces output on the touchpad are linear (or approximately linear) and oriented along the z-axis, approximately perpendicular to the surface of the touchpad 16 and the top surface of computer 10. In a different embodiment, forces can be applied to the touchpad 16 to cause side-to-side (e.g., x-y) motion of the pad in the plane of its surface in addition to or instead of z-axis motion, although such motion is not preferred.

Using one or more actuators coupled to the touchpad 16, a variety of haptic sensations can be output to the user who is contacting the pad. For example, jolts, vibrations (varying or constant amplitude), and textures can be output. Forces output on the pad can be at least in part based on the location of the finger on the pad or the state of a controlled object in the graphical environment of the host computer 10, and/or independent of finger position or object state. Such forces output on the touchpad 16 are considered "computer-controlled" since a microprocessor or other electronic controller is controlling the magnitude and/or direction of the force output of the actuator(s) using electronic signals. Preferably, the entire pad 16 is provided with haptic sensations as a single unitary member; in other embodiments, individually-moving portions of the pad can each be provided with its own haptic feedback actuator and related transmissions so that haptic sensations can be provided for only a particular portion. For example, some embodiments may include a touchpad having different portions that may be flexed or otherwise moved with respect to other portions of the pad.

In other embodiments, the touchpad 16 can be provided in a separate housing that is connected to a port of the computer 10 via a cable or via wireless transmission and which receives force information from and sends position information to the computer 10. For example, Universal Serial Bus (USB), Firewire, or a standard serial bus can connect such a touchpad to the computer 10. In such an embodiment, the computer 10 can be any desktop or stationary computer or device and need not be a portable device.

One or more buttons 26 can also be provided on the housing of the computer 10 to be used in conjunction with the touchpad 16. The user's hands have easy access to the buttons, each of which may be pressed by the user to provide a distinct input signal to the host computer 12. Typically, each button 26 corresponds to a similar button found on a mouse input device, so that a left button can be used to select a graphical object (click or double click), a right button can bring up a context menu, etc. In some embodiments, one or more of the buttons 26 can be provided with tactile feedback as described in U.S. Pat. No. 6,184,868 and U.S. Pat. No. 6,563,487. Other features of these disclosures may also be used.

Furthermore, in some embodiments, one or more moveable portions 28 of the housing of the computer device 10 can be included which is contacted by the user when the user operates the touchpad 16 and which can provide haptic feedback. Having a moveable portion of a housing for haptic feedback is described in U.S. Pat. No. 6,184,868 and U.S. Pat. No. 6,088,019. Thus, both the housing can provide haptic feedback (e.g., through the use of an eccentric rotating mass on a motor coupled to the housing) and the touchpad 16 can provide separate haptic feedback. This allows the host to control two different tactile sensations simultaneously to the user, for example, a vibration of a low frequency can be conveyed through the housing to the user and a higher frequency vibration can be conveyed to the user through the touchpad 16. Each other button or other control provided with haptic feedback can also provide tactile feedback independently from the other controls.

The host application program(s) and/or operating system preferably displays graphical images of the environment on display device 12. The software and environment running on the host computer 12 may be of a wide variety. For example, the host application program can be a word processor, spreadsheet, video or computer game, drawing program, operating system, graphical user interface, simulation, Web page or browser that implements HTML or VRML instructions, scientific analysis program, virtual reality training program or application, or other application program that utilizes input from the touchpad 16 and outputs force feedback commands to the touchpad 16. For example, many games and other application programs include force feedback functionality and may communicate with the touchpad 16 using a standard protocol/drivers such as I-Force®, FEELit®, or Touchsense™ available from Immersion Corporation of San Jose, Calif.

The touchpad 16 can include circuitry necessary to report control signals to the microprocessor of the host computer 10 and to process command signals from the host's microprocessor. For example, appropriate sensors (and related circuitry) are used to report the position of the user's finger on the touchpad 16. The touchpad device also includes circuitry that receives signals from the host and outputs tactile sensations in accordance with the host signals using one or more actuators. In some embodiments, a separate, local microprocessor can be provided for the touchpad 16 to both report touchpad sensor data to the host and/or to carry out force commands received from the host, such commands including, for example, the type of haptic sensation and parameters describing the commanded haptic sensation. Alternatively, the touchpad microprocessor can simply pass streamed data from the main processor to the actuators. The term "force information" can include both commands/parameters and streamed data. The touchpad microprocessor can implement haptic sensations independently after receiving a host command by controlling the touchpad actuators; or, the host processor can maintain a greater degree of control over the haptic sensations by controlling the actuators more directly. In other embodiments, logic circuitry such as state machines provided for the touchpad 16 can handle haptic sensations as directed by the host main processor. Architectures and control methods that can be used for reading sensor signals and providing haptic feedback for a device are described in greater detail in U.S. Pat. No. 5,734,373 and co-pending application Nos. 60/156,354, 60/133,208, Ser. No. 09/376,649, U.S. Pat. No. 6,639,581 and 60/160,401.

Figure 2:
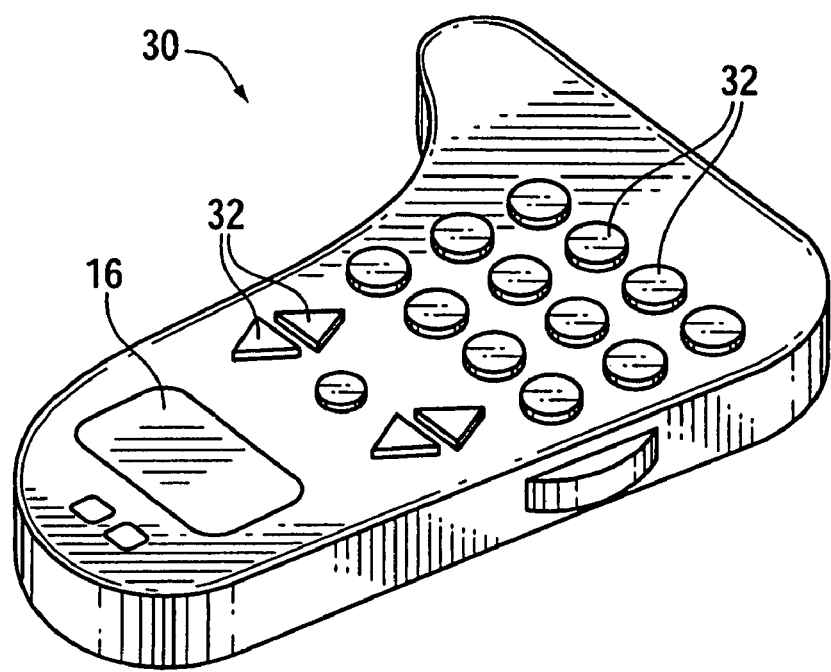
FIG. 2 is a perspective view of a remote control device including the touchpad.

FIG. 2 is a perspective view of another embodiment of a device which can include the active touchpad 16. The device can be a handheld remote control device 30, which the user grasps in one hand and manipulates controls to access the functions of an electronic device or appliance remotely by a user (such as a television, video cassette recorder or DVD player, audio/video receiver, Internet or network computer connected to a television, etc.). For example, several buttons 32 can be included on the remote control device 30 to manipulate functions of the controlled apparatus. A touchpad 16 can also be provided to allow the user to provide more sophisticated directional input. For example, a controlled apparatus may have a selection screen in which a cursor may be moved, and the touchpad 16 can be manipulated to control the cursor in two dimensions. The touchpad 16 includes the ability to output haptic sensations to the user as described herein, based on a controlled value or event. For example, a volume level passing a mid-point or reaching a maximum level can cause a pulse to be output to the touchpad and to the user.

In one application, the controlled apparatus can be a computer system such as Web-TV from Microsoft Corp. or other computing device which displays a graphical user interface and/or web pages accessed over a network such as the Internet. The user can control the direction of the cursor by moving a finger (or other object) on the touchpad 16. The cursor can be used to select and/or manipulate icons, windows, menu items, graphical buttons, slider bars, scroll bars, or other graphical objects in a graphical user interface or desktop interface. The cursor can also be used to select and/or manipulate graphical objects on a web page, such as links, images, buttons, etc. Other force sensations associated with graphical objects are described below with reference to FIG. 7.

Figure 3:
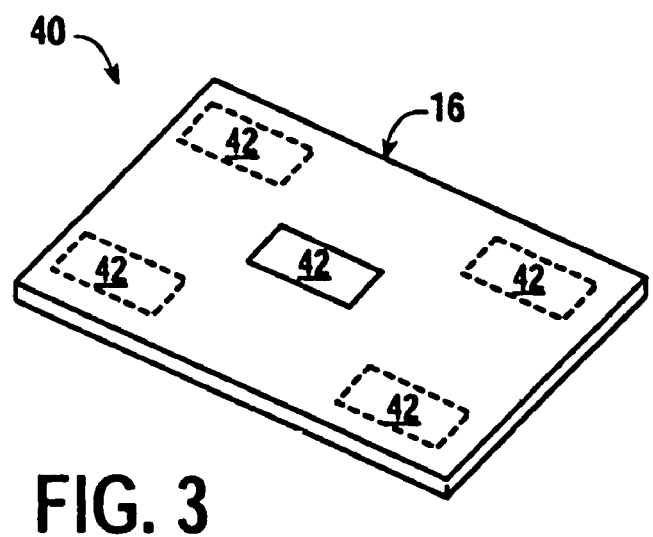
FIG. 3 is a perspective view of a first embodiment of the touchpad including one or more actuators coupled to the underside of the touchpad.

FIG. 3 is a perspective view of a first embodiment 40 of a touchpad 16 for providing haptic feedback to the user. In this embodiment, one or more piezoelectric actuators 42 are coupled to the underside of the touchpad 16. The piezoelectric actuator 42 is driven by suitable electronics, as is well known to those skilled in the art. In one embodiment, a single piezoelectric actuator 42 is positioned at or near the center of the touchpad 16, or off to one side if space constraints of the housing require such a position. In other embodiments, multiple piezoelectric actuators 42 can be positioned at different areas of the touchpad; the dashed lines show one configuration, where an actuator 42 is placed at each corner of the pad 16 and at the center of the pad.

The piezoelectric actuators 42 can each output a small pulse, vibration, or texture sensation on the touchpad 16 and to the user if the user is contacting the touchpad. The entire touchpad 16 is preferably moved with the forces output by actuator(s) 42. Preferably, the forces output on the touchpad are linear (or approximately linear) and along the z-axis, approximately perpendicular to the surface of the touchpad 16 and the top surface of computer 10. In a different embodiment, as mentioned above, forces can be applied to the touchpad 16 to cause side-to-side (e.g., x-y) motion of the pad in the plane of its surface in addition to or instead of z-axis motion. For example, one linear actuator can provide motion for the x-axis, and a second linear actuator can provide motion for the y-axis and/or the x-axis.

The frequency of a vibration output by an actuator 42 can be varied by providing different control signals to an actuator 42. Furthermore, the magnitude of a pulse or vibration can be controlled based on the applied control signal. If multiple actuators 42 are provided, a stronger vibration can be imparted on the touchpad by activating two or more actuators simultaneously. Furthermore, if an actuator is positioned at an extreme end of the touchpad and is the only actuator that is activated, the user may experience a stronger vibration on the side of the touchpad having the actuator than on the opposite side of the touchpad. Different magnitudes and localized effects can be obtained by activating some but not all of the actuators. Since the tip of a user's finger that is touching the pad is fairly sensitive, the output forces do not have to be of a high magnitude for the haptic sensation to be effective and compelling.

Besides using a finger to contact the touchpad, the user may also hold other objects that directly contact the touchpad. Any haptic sensations output on the pad can be transmitted through the held object to the user's hand. For example, the user can hold a stylus having a point that contacts the touchpad 16 more precisely than a finger. Other objects may also be used. In some embodiments, specialized objects can be used to enhance the haptic sensations. For example, a stylus or other object having a flexible portion or compliance may be able to magnify at least some of the touchpad haptic sensations as experienced by the user.

The piezoelectric actuators 42 have several advantages for the touchpad 16. These actuators can be made very thin and small, allowing their use in compact housings that are typical for portable electronic devices. They also require very low power, and are thus suitable for devices with limited power (e.g., powered by batteries). In some embodiments described herein, power for the actuators can be drawn off a bus connecting the computer to the touchpad (or touch screen). For example, if the touchpad 16 is provided in a separate housing, a Universal Serial Bus can connect the pad to the computer and provide power from the computer to the pad as well as data (e.g. streaming force data, force commands, etc.).

Figure 4:
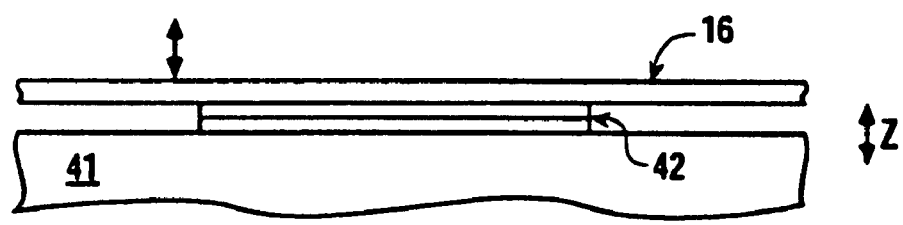
FIG. 4 is a side elevational view of a first embodiment in which a piezo-electric actuator is directly coupled to the touchpad.

FIG. 4 is a side elevational view of the embodiment 40 of the touchpad 16 as shown in FIG. 3. Touchpad 16 is directly coupled to a grounded piezo-electric actuator 42 which operates to produce a force on the touchpad 16 when an electrical signal is input to the actuator. Typically, a piezo-electric actuator includes two layers which can move relative to each other when a current is applied to the actuator; here, the grounded portion of the actuator remains stationary with respect to the surrounding housing 41 while the moving portion of the actuator and the touchpad move with respect to the housing 41. The operation of piezo-electric actuators to output force based on an input electrical signal is well known to those skilled the art.

The touchpad 16 can be coupled only to the actuator 42, or can be additionally coupled to the housing of the computer device at other locations besides the actuators 42. Preferably the other couplings are compliant connections, using a material or element such as a spring or foam. If such connections are not made compliant, then the touchpad 16 itself preferably has some compliance to allow portions of the pad to move in response to actuator forces and to convey the haptic sensations to the user more effectively.

Since the touchpad 16 is directly coupled to the actuator 42, any produced forces are directly applied to the touchpad 16. The electric signal preferably is obtained from a microprocessor and any circuitry required to convert the microprocessor signal to an appropriate signal for use with the actuator 42.

Figure 5:
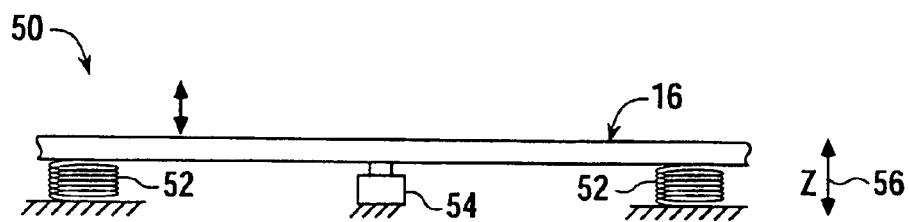
FIG. 5 is a side elevational view of a second embodiment of the touchpad including a linear actuator.

FIG. 5 is a side elevational view of another embodiment 50, in which the touchpad 16 is positioned on one or more springs 52. The springs 52 couple the touchpad 16 to the rigid housing of the computer 10 and allow the touchpad 16 to be moved along the z-axis 56. Only a very small range of motion is required to produce effective pulses (jolts) or vibrations on the pad 16. Stops (not shown) can be positioned to limit the travel of the touchpad 16 to a desired range along the z-axis.

An actuator 54 is also coupled to the touchpad 16 to impart forces on the touchpad and cause the touchpad 16 to move along the z-axis. In the present embodiment, actuator 54 is a linear voice coil actuator, where the moving portion (bobbin) of the actuator is directly coupled to the touchpad 16. The actuator 54 is grounded to the computer 10 housing and outputs a linear force on the touchpad 16 and thus drives the touchpad along the z-axis. A short pulse or jolt can be output, or the moving portion of the actuator can be oscillated to provide a vibration having a particular desired frequency. The springs 52 cause the touchpad 16 to return to a rest position after a force from the actuator causes the touchpad to move up or down. The springs can also provide a compliant suspension for the touchpad 16 and allow forces output by the actuator 54 to be amplified as explained above. Different types of spring elements can be used in other embodiments to couple the touchpad 16 to the rigid housing, such as leaf springs, foam, flexures, or other compliant materials.

In some embodiments, the user is able to push the touchpad 16 along the z-axis to provide additional input to the computer 10. For example, a sensor can be used to detect the position of the touchpad 16 along the z-axis, such as an optical sensor, magnetic sensor, Polhemus sensor, etc. The position on the z-axis can be used to provide proportional input to the computer, for example. In addition, other types of forces can be output along the z-axis, such as spring forces, damping forces, inertial forces, and other position-based forces, as disclosed in U.S. Pat. No. 6,563,487. In addition, 3-D elevations can be simulated in the graphical environment by moving the pad to different elevations along the z-axis. If the pad 16 can be used as an analog input depending on the distance the entire pad is moved along the z-axis, and/or if kinesthetic (force) feedback is applied in the z-axis degree of freedom, then a greater range of motion for the pad 16 along the z-axis is desirable. An elastomeric layer can be provided if the touchpad 16 is able to be pressed by the user to close a switch and provide button or switch input to the computer 10 (e.g. using contact switches, optical switches, or the like). If such z-axis movement of the pad 16 is allowed, it is preferred that the z-axis movement require a relatively large amount of force to move the pad at least initially, since such z-axis movement may not be desired during normal use of the pad by the user.

The voice coil actuator 54 preferably includes a coil and a magnet, where a current is flowed through the coil and interacts with the magnetic field of the magnet to cause a force on the moving portion of the actuator (the coil or the magnet, depending on the implementation), as is well known to those skilled in the art and is described in U.S. Pat. No. 6,184,868. Other types of actuators can also be used, such as a standard speaker, an E-core type actuator (as described in U.S. Pat. No. 6,704,001), a solenoid, a pager motor, a DC motor, moving magnet actuator (described in provisional application No. 60/133,208 and U.S. Pat. No. 6,704,001), or other type of actuator. Furthermore, the actuator can be positioned to output linear motion along an axis perpendicular to the z-axis or along another direction different from the z-axis (rotary or linear), where a mechanism converts such output motion to linear motion along the z-axis as is well known to those skilled in the art.

The touchpad 16 can also be integrated with an elastomeric layer and/or a printed circuit board in a sub-assembly, where one or more actuators are coupled to the printed circuit board to provide tactile sensations to the touchpad 16. Helical springs can also be provided to engage electrical contacts. Or, multiple voice coil actuators can be positioned at different locations under the touchpad 16. These embodiments are described in U.S. Pat. No. 6,563,487. Any of the actuators described in that patent can also be used.

Figure 6:
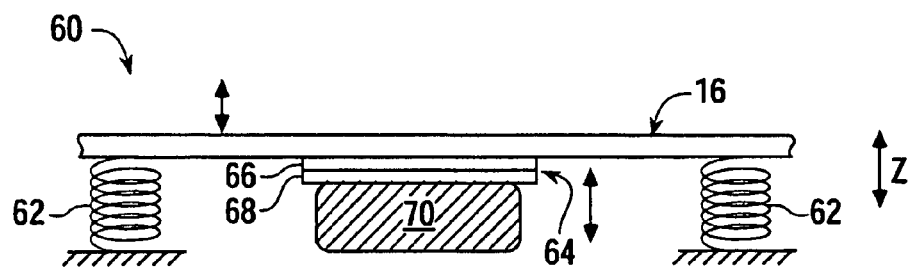
FIG. 6 is a side elevational view of a third embodiment of the touchpad having an inertial mass.

FIG. 6 is a side elevational view of a third embodiment 60 of the haptic touchpad 16. In this embodiment, the stationary portion of the actuator is coupled to the touchpad 16, and the moving portion of the actuator is coupled to an inertial mass to provide inertial haptic sensations.

Touchpad 16 can be compliantly mounted to the rigid housing of the computer device similarly to the embodiments described above. For example, one or more spring elements 62 can be coupled between the touchpad and the housing. These springs can be helical or leaf springs, a compliant material such as rubber or foam, flexures, etc.

One or more actuators 64 are coupled to the underside of the touchpad 16. In the embodiment of FIG. 6, a piezoelectric actuator is shown. One portion 66 of each actuator 64 is coupled to the touchpad 16, and the other portion 68 is coupled to a mass 70. Thus, when the portion 68 is moved relative to the portion 66, the mass 70 is moved with the portion 68. The mass 70 can be any suitable object of the desired weight, such as plastic or metal material. The mass 70 is moved approximately along the z-axis and is not coupled to the housing, allowing free motion. The motion of the mass 70 along the z-axis causes an inertial force that is transmitted through the actuator 64 to the touchpad 16, and the touchpad 16 moves along the z-axis due to the compliant coupling 62. The motion of the touchpad 16 is felt by the user contacting the touchpad 16 as a haptic sensation.

In different embodiments, other types of actuators can be used. For example, a linear voice coil actuator as described for FIG. 5 can be used, in which an inertial mass is coupled to the linear-moving portion of the voice coil actuator. Other actuators can also be used, such as solenoids, pager motors, moving magnet actuators, E-core actuators, etc. Many actuators used for inertial haptic sensations are described in U.S. Pat. No. 6,211,861. Furthermore, a rotary actuator can be used, where the rotary output force is converted to a linear force approximately along the z-axis. For example, the rotary force can be converted using a flexure, as described in U.S. Pat. No. 6,697,043.

In the preferred linear force implementation, the direction or degree of freedom that the force is applied on the touchpad with respect to the inertial mass is important. If a significant component of the force is applied in the planar workspace of the touchpad (i.e., along the X or Y axis) with respect to the inertial mass, a short pulse or vibration can interfere with the user's object motion in one or both of those planar degrees of freedom and thereby impair the user's ability to accurately guide a controlled graphical object, such as a cursor, to a given target. Since a primary function of the touchpad is accurate targeting, a tactile sensation that distorts or impairs targeting, even mildly, is undesirable. To solve this problem, the touchpad device applies inertial forces substantially along the Z axis, orthogonal to the planar X and Y axes of the touchpad surface. In such a configuration, tactile sensations can be applied at a perceptually strong level for the user without impairing the ability to accurately position a user controlled graphical object in the X and Y axes of the screen. Furthermore, since the tactile sensations are directed in a third degree of freedom relative to the two-dimensional planar workspace and display screen, jolts or pulses output along the Z axis feel much more like three-dimensional bumps or divots to the user that come "out" or go "into" the screen, increasing the realism of the tactile sensations and creating a more compelling interaction. For example, an upwardly-directed pulse that is output when the cursor is moved over a window border creates the illusion that the user is moving a finger or other object "over" a bump at the window border.

Figure 7:
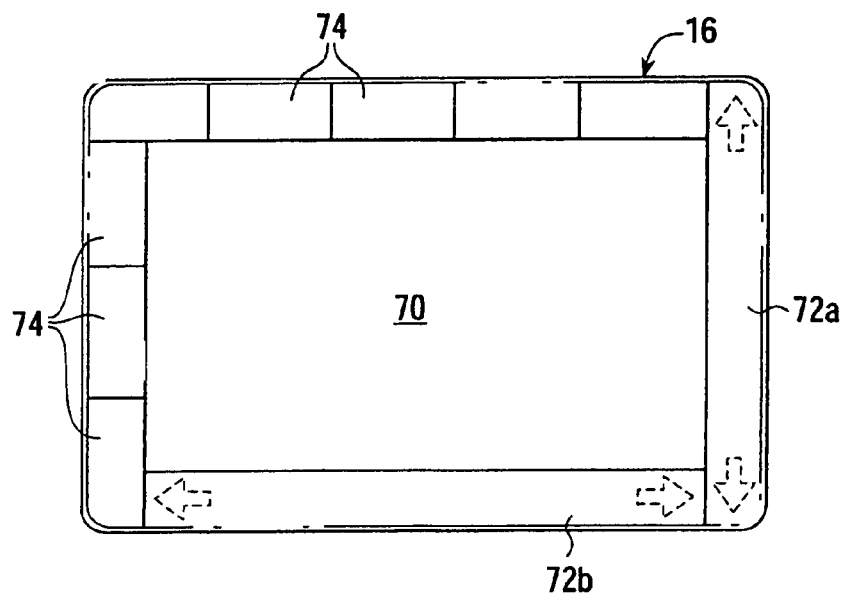
FIG. 7 is a top plan view of an example of a touchpad having different control regions.

FIG. 7 is a top elevational view of the touchpad 16. Touchpad 16 can in some embodiments be used simply as a positioning device, where the entire area of the pad provides cursor control. In other embodiments, different regions of the pad can be designated for different functions. In some of these region embodiments, each region can be provided with an actuator located under the region, while other region embodiments may use a single actuator that imparts forces on the entire pad 16. In the embodiment shown, a central cursor control region 70 is used to position the cursor.

The cursor control region 70 of the pad 16 can cause forces to be output on the pad based on interactions of the controlled cursor with the graphical environment and/or events in that environment. The user moves a finger or other object within region 70 to correspondingly move the cursor 20. Forces are preferably associated with the interactions of the cursor with displayed graphical objects. For example, a jolt or "pulse" sensation can be output, which is a single impulse of force that quickly rises to the desired magnitude and then is turned off or quickly decays back to zero or small magnitude. The touchpad 16 can be jolted in the z-axis to provide the pulse. A vibration sensation can also be output, which is a time-varying force that is typically periodic. The vibration can cause the touchpad 16 or portions thereof to oscillate back and forth on the z axis, and can be output by a host or local microprocessor to simulate a particular effect that is occurring in a host application.

Another type of force sensation that can be output on the touchpad 16 is a texture force. This type of force is similar to a pulse force, but depends on the position of the user's finger on the area of the touchpad and/or on the location of the cursor in the graphical environment. Thus, texture bumps are output depending on whether the cursor has moved over a location of a bump in a graphical object. This type of force is spatially-dependent, i.e. a force is output depending on the location of the cursor as it moves over a designated textured area; when the cursor is positioned between "bumps" of the texture, no force is output, and when the cursor moves over a bump, a force is output. This can be achieved by host control (e.g., the host sends the pulse signals as the cursor is dragged over the grating). In some embodiments, a separate touchpad microprocessor can be dedicated for haptic feedback with the touchpad, and the texture effect and be achieved using local control (e.g., the host sends a high level command with texture parameters and the sensation is directly controlled by the touchpad processor). In other cases a texture can be performed by presenting a vibration to a user, the vibration being dependent upon the current velocity of the user's finger (or other object) on the touchpad. When the finger is stationary, the vibration is deactivated; as the finger is moved faster, the frequency and magnitude of the vibration is increased. This sensation can be controlled locally by the touchpad processor (if present), or be controlled by the host. Local control by the pad processor may eliminate communication burden in some embodiments. Other spatial force sensations can also be output. In addition, any of the described force sensations herein can be output simultaneously or otherwise combined as desired.

Different types of graphical objects can be associated with tactile sensations. Tactile sensations can output on the touchpad 16 based on interaction between a cursor and a window. For example, a z-axis "bump" or pulse can be output on the touchpad to signal the user of the location of the cursor when the cursor is moved over a border of a window. When the cursor is moved within the window's borders, a texture force sensation can be output. The texture can be a series of bumps that are spatially arranged within the area of the window in a predefined pattern; when the cursor moves over a designated bump area, a bump force is output on the touchpad. A pulse or bump force can be output when the cursor is moved over a selectable object, such as a link in a displayed web page or an icon. A vibration can also be output to signify a graphical object which the cursor is currently positioned over. Furthermore, features of a document displaying in a window can also be associated with force sensations. For example, a pulse can be output on the touchpad when a page break in a document is scrolled past a particular area of the window. Page breaks or line breaks in a document can similarly be associated with force sensations such as bumps or vibrations.

Furthermore, a menu items in a displayed menu can be selected by the user after a menu heading or graphical button is selected. The individual menu items in the menu can be associated with forces. For example, vertical (z-axis) bumps or pulses can be output when the cursor is moved over the border between menu items. The sensations for certain menu choices can be stronger than others to indicate importance or frequency of use, i.e., the most used menu choices can be associated with higher-magnitude (stronger) pulses than the less used menu choices. Also, currently-disabled menu choices can have a weaker pulse, or no pulse, to indicate that the menu choice is not enabled at that time. Furthermore, when providing tiled menus in which a sub-menu is displayed after a particular menu element is selected, as in Microsoft Windows™, pulse sensations can be sent when a sub-menu is displayed. This can be very useful because users may not expect a sub-menu to be displayed when moving a cursor on a menu element. Icons can be associated with textures, pulses, and vibrations similarly to the windows described above. Drawing or CAD programs also have many features which can be associated with similar haptic sensations, such as displayed (or invisible) grid lines or dots, control points of a drawn object, etc.

In other related interactions, when a rate control or scrolling function is performed with the touchpad (through use of the cursor), a vibration can be displayed on the device to indicate that scrolling is in process. When reaching the end of a numerical range that is being adjusted (such as volume), a pulse can be output to indicate that the end of the range has been reached. Pulse sensations can be used to indicate the location of the "ticks" for discrete values or settings in the adjusted range. A pulse can also be output to inform the user when the center of the range is reached. Different strength pulses can also be used, larger strength indicating the more important ticks. In other instances, strength and/or frequency of a vibration can be correlated with the adjustment of a control to indicate current magnitude of the volume or other adjusted value. In other interactions, a vibration sensation can be used to indicate that a control function is active. Furthermore, in some cases a user performs a function, like selection or cutting or pasting a document, and there is a delay between the button press that commands the function and the execution of the function, due to processing delays or other delays. A pulse sensation can be used to indicate that the function (the cut or paste) has been executed.

Furthermore, the magnitude of output forces on the touchpad can depend on the event or interaction in the graphical environment. For example, the force pulse can be a different magnitude of force depending on the type of graphical object encountered by the cursor. For example, a pulses of higher magnitude can be output when the cursor moves over windows, while pulses of lower magnitude can be output when the cursor moves over icons. The magnitude of the pulses can also depend on other characteristics of graphical objects, such as an active window as distinguished a background window, file folder icons of different priorities designated by the user, icons for games as distinguished from icons for business applications, different menu items in a drop-down menu, etc. The user or developer can also preferably associate particular graphical objects with customized haptic sensations.

User-independent events can also be relayed to the user using haptic sensations on the touchpad. An event occurring within the graphical environment, such as an appointment reminder, receipt of email, explosion in a game, etc., can be signified using a vibration, pulse, or other time-based force. The force sensation can be varied to signify different events of the same type. For example, vibrations of different frequency can each be used to differentiate different events or different characteristics of events, such as particular users sending email, the priority of an event, or the initiation or conclusion of particular tasks (e.g. the downloading of a document or data over a network). When the host system is "thinking," requiring the user to wait while a function is being performed or accessed (usually when a timer is displayed by the host) it is often a surprise when the function is complete. If the user takes his or her eyes off the screen, he or she may not be aware that the function is complete. A pulse sensation can be sent to indicate that the "thinking" is over.

A software designer may want to allow a user to be able to select options or a software function by positioning a cursor over an area on the screen using the touchpad, but not require pressing a physical button or tapping the touchpad to actually select the option. Currently, it is problematic to allow such selection because a user has physical confirmation of execution when pressing a physical button. A pulse sent to the touchpad can act as that physical confirmation without the user having to press a button or other control for selection. For example, a user can position a cursor over a web page element, and once the cursor is within the desired region for a given period of time, an associated function can be executed. This is indicated to the user through a tactile pulse sent to the pad 16.

The above-described force sensations can also be used in games or simulations. For example, a vibration can be output when a user-controlled racing car is driving on a dirt shoulder of a displayed road, a pulse can be output when the car collides with another object, and a varying-frequency vibration can be output when a vehicle engine starts and rumbles. The magnitude of pulses can be based on the severity of a collision or explosion, the size of the controlled graphical object or entity (and/or the size of a different graphical object/entity that is interacted with), etc. Force sensations can also be output based on user-independent events in the game or simulation, such as pulses when bullets are fired at the user's character.

The above haptic sensations can be similar to those described in U.S. Pat. No. 6,243,078 and U.S. Pat. No. 6,211,861. Other control devices or grips that can include a touchpad 16 in its housing include a gamepad, mouse or trackball device for manipulating a cursor or other graphical objects in a computer-generated environment; or a pressure sphere or the like. For example, the touchpad 16 can be provided on the housing of a computer mouse to provide additional input to the host computer. Furthermore, selective disturbance filtering of forces, as described in U.S. Pat. No. 6,020,876, and shaping of force signals to drive the touchpad with impulse waves as described in U.S. Pat. No. 5,959,613, can be used. Such impulses are also effective when driven with stored power in a battery on the computer 10 or from a bus such as USB connected to a host computer.

The touchpad 16 can also be provided with different control regions that provide separate input from the main cursor control region 70. In some embodiments, the different regions can be physically marked with lines, borders, or textures on the surface of the pad 16 (and/or sounds from the computer 10) so that the user can visually, audibly, and/or or tactilely tell which region he or she is contacting on the pad.

For example, scroll or rate control regions 72a and 72b can be used to provide input to perform a rate control task, such as scrolling documents, adjusting a value (such as audio volume, speaker balance, monitor display brightness, etc.), or panning/tilting the view in a game or virtual reality simulation. Region 72a can be used by placing a finger (or other object) within the region, where the upper portion of the region will increase the value, scroll up, etc., and the lower portion of the region will decrease the value, scroll down, etc. In embodiments that can read the amount of pressure placed on the pad 16, the amount of pressure can directly control the rate of adjustment; e.g., a greater pressure will cause a document to scroll faster. The region 72b can similarly be used for horizontal (left/right) scrolling or rate control adjustment of a different value, view, etc.

Particular haptic effects can be associated with the control regions 72a and 72b. For example, when using the rate control region 72a or 72b, a vibration of a particular frequency can be output on the pad 16. In those embodiments having multiple actuators, an actuator placed directly under the region 72a or 72b can be activated to provide a more localized tactile sensation for the "active" (currently used) region. As a portion of a region 72 is pressed for rate control, pulses can be output on the pad (or region of the pad) to indicate when a page has scroll by, a particular value has passed, etc. A vibration can also be continually output while the user contacts the region 72a or 72b.

Other regions 74 can also be positioned on the touchpad 16. For example, each of regions 74 provides a small rectangular area, like a button, which the user can point to in order to initiate a function associated with the pointed-to region. The regions 74 can initiate such computer functions as running a program, opening or closing a window, going "forward" or "back" in a queue of web pages in a web browser, powering the computer 10 or initiating a "sleep" mode, checking mail, firing a gun in a game, cutting or pasting data from a buffer, selecting a font, etc. The regions 74 can duplicate functions and buttons provided in an application program or provide new, different functions.

Similarly to regions 72 the regions 74 an each be associated with haptic sensations; for example, a region 74 can provide a pulse sensation when it has been selected by the user, providing instant feedback that the function has been selected. Furthermore, the same types of regions can be associated with similar-feeling haptic sensations. For example, each word-processor related region 74 can, when pointed to, cause a pulse of a particular strength, while each game-related region can provide a pulse of different strength or a vibration. Furthermore, when the user moves the pointing object from one region 72 or 74 to another, a haptic sensation (such as a pulse) can be output on the pad 16 to signify that a region border has been crossed.

In addition, the regions are preferably programmable in size and shape as well as in the function with which they are associated. Thus, the functions for regions 64 can change based on an active application program in the graphical environment and/or based on user preferences input to and/or stored on the computer 10. Preferably, the size and location of each of the regions can be adjusted by the user or by an application program, and any or all of the regions can be completely removed if desired. Furthermore, the user is preferably able to assign particular haptic sensations to particular areas or types of areas based on types of functions associated with those areas, as desired. Different haptic sensations can be designed in a tool such as Immersion Studio™ available from Immersion Corporation of San Jose, Calif.

It should be noted that the regions 72 and 74 need not be physical regions of the touchpad 16. That is, the entire touchpad 16 surface need merely provide coordinates of user contact to the processor of the computer and software on the computer can designate where different regions are located. The computer can interpret the coordinates and, based on the location of the user contact, can interpret the touchpad input signal as a cursor control signal or a different type of signal, such as rate control, button function, etc. The local touchpad microprocessor, if present, may alternatively interpret the function associated with the user contact location and report appropriate signal or data to the host processor (such as position coordinates or a button signal), thus keeping the host processor ignorant of the lower level processing. In other embodiments, the touchpad 16 can be physically designed to output different signals to the computer based on different regions marked on the touchpad surface that are contacted by the user; e.g. each region can be sensed by a different sensor or sensor array.

Figure 8A:
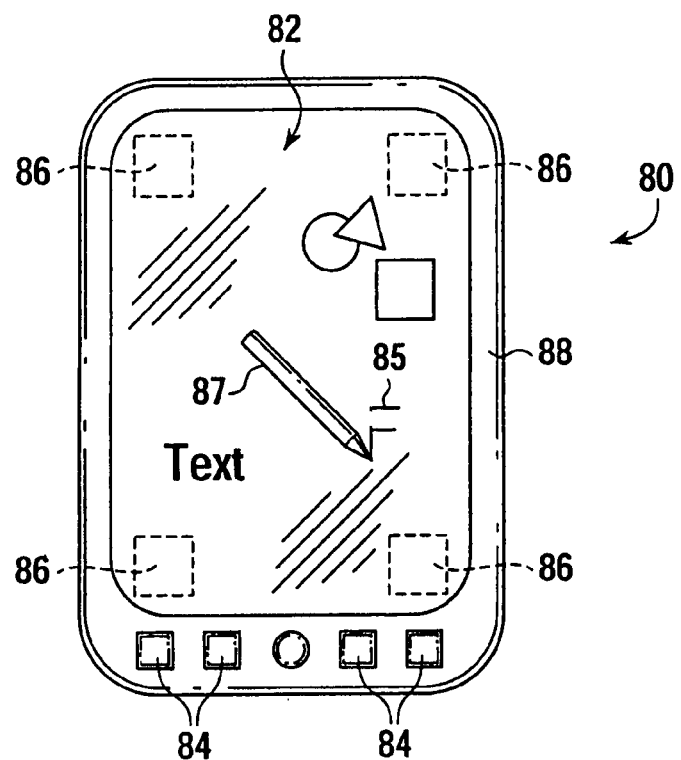
FIGS. 8a and 8b are top plan and side cross sectional views, respectively, of a touch screen embodiment.
Figure 8B:
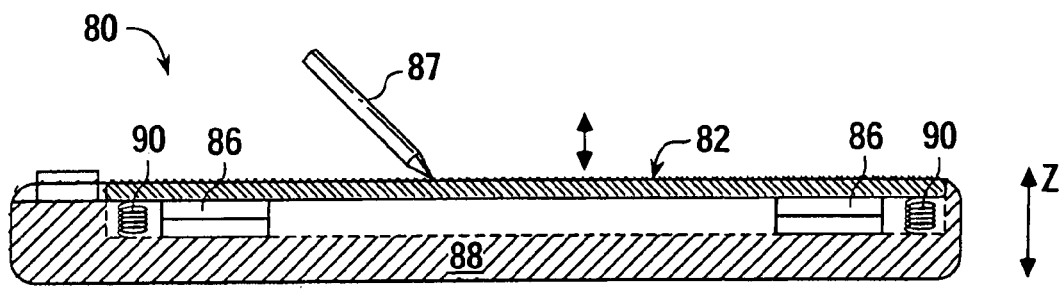

FIGS. 8a and 8b are top plan and side cross-sectional views, respectively, of another computer device embodiment 80 including a form of the haptic touchpad 16. Device 80 is in the form of a portable computer device such as "personal digital assistant" (PDA), a "pen-based" computer, "electronic book", or similar device (collectively known as a "personal digital assistant" or PDA herein). Those devices which allow a user to input information by touching a display screen or readout in some fashion are primarily relevant to this embodiment. Such devices can include the Palm Pilot from 3Com Corp., the Newton from Apple Computer, pocket-sized computer devices from Casio, Hewlett-Packard, or other manufacturers, cellular phones or pagers having touch screens, etc.

In one embodiment of a device 80, a display screen 82 typically covers a large portion of the surface of the computer device 80. Screen 82 is preferably a flat-panel display as is well known to those skilled in the art and can display text, images, animations, etc.; in some embodiments screen 80 is as functional as any personal computer screen. Display screen 82 is preferably a "touch screen" that includes sensors which allow the user to input information to the computer device 80 by physically contacting the screen 80 (i.e. it is another form of planar "touch device" similar to the touchpad 16). For example, a transparent sensor film can be overlaid on the screen 80, where the film can detect pressure from an object contacting the film. The sensor devices for implementing touch screens are well known to those skilled in the art.

The user can select graphically-displayed buttons or other graphical objects by pressing a finger or a stylus to the screen 82 at the exact location where the graphical object is displayed. Furthermore, some embodiments allow the user to "draw" or "write" on the screen by displaying graphical "ink" images 85 at locations where the user has pressed a tip of a stylus, finger, or other object. Handwritten characters can be recognized by software running on the device microprocessor as commands, data, or other input. In other embodiments, the user can provide input additionally or alternatively through voice recognition, where a microphone on the device inputs the user's voice which is translated to appropriate commands or data by software running on the device. Physical buttons 84 can also be included in the housing of the device 80 to provide particular commands to the device 80 when the buttons are pressed. Many PDA's are characterized by the lack of a standard keyboard for character input from the user; rather, an alternative input mode is used, such as using a stylus to draw characters on the screen, voice recognition, etc. However, some PDA's also include a fully-functional keyboard as well as a touch screen, where the keyboard is typically much smaller than a standard-sized keyboard. In yet other embodiments, standard-size laptop computers with standard keyboards may include flat-panel touch-input display screens, and such screens (similar to screen 12 of FIG. 1) can be provided with haptic feedback.

The touch screen 82 provides haptic feedback to the user similarly to the touchpad 16 described in previous embodiments. One or more actuators 86 can be coupled to the underside of the touch screen 82 to provide haptic feedback such as pulses, vibrations, and textures; for example, an actuator 86 can be positioned near each corner of the screen 82, as shown in FIG. 8a. Other configurations of actuators can also be used. The user can experience the haptic feedback through a finger or a held object such as a stylus 87 that is contacting the screen 82.

As shown in FIG. 8b, the touch screen 82 is preferably coupled to the housing 88 of the device 80 by one or more spring or compliant elements 90, such as helical springs, leaf springs, flexures, or compliant material (foam, rubber, etc.) The compliant element allows the touch screen 82 to move approximately along the z-axis, thereby providing haptic feedback similarly to the touchpad embodiments described above. Actuators 86 can be piezo-electric actuators, voice coil actuators, or any of the other types of actuators described above for the touchpad embodiments. As shown in FIG. 8b, the actuators 86 are directly coupled to the touch screen 82 similarly to the touchpad embodiment of FIG. 3; alternatively, an inertial mass can be moved to provide inertial feedback in the z-axis of the touch screen, similarly to the touchpad embodiment of FIG. 6. Other features described above for the touchpad are equally applicable to the touch screen embodiment 80.

In the embodiments of touch input devices (touchpad and touch screen) described herein, it is also advantageous that contact of the user is detected by the touch input device. Since haptic feedback need only be output when the user is contacting the touch device, this detection allows haptic feedback to be stopped (actuators "turned off") when no objects are contacting the touch input device. This feature can conserve battery power for portable devices. If a local touch device microprocessor (or similar circuitry) is being used in the computer, such a microprocessor can turn off actuator output when no user contact is sensed, thus alleviating the host processor of additional computational burden.

While the subject matter has been described in terms of several preferred embodiments, it is contemplated that alterations, permutations, and equivalents thereof will become apparent to those skilled in the art upon a reading of the specification and study of the drawings. For example, many different types of actuators can be used to output tactile sensations to the user. Furthermore, many of the features described in one embodiment can be used interchangeably with other embodiments. Furthermore, certain terminology has been used for the purposes of descriptive clarity, and not to be limiting.

What is claimed is:

1. A haptic feedback device, comprising:
a touch screen operative to display a graphical image and to output a position signal associated with cursor positioning, wherein the touch screen comprises a first region associated with the cursor positioning and a second region configured to provide a second signal different from the first signal and associated with a control functionality different from cursor positioning, and wherein the first and second regions are associated with different haptic effects; and
at least a first actuator configured to impart a first force to the touch screen to thereby provide a haptic effect in response to the cursor positioning or the control functionality different from cursor positioning, the first force based on information output by a computer device.

2. The haptic feedback device of claim 1, wherein the computer device comprises a portable computer.

3. The haptic feedback device of claim 2, wherein the portable computer comprises a PDA, a pager or a cellular phone.

4. The haptic feedback device of claim 1, wherein the touch screen is provided in a housing that is separate from the computer device.

5. The haptic feedback device of claim 1, wherein the touch screen is operative to receive a location selection from a user's finger.

6. The haptic feedback device of claim 1, wherein the touch screen is operative to receive a location selection from a physical object held by the user.

7. The haptic feedback device of claim 6, wherein the physical object is a stylus.

8. The haptic feedback device of claim 1, wherein the touch screen is integrated in a housing of a handheld device that is capable of operation by at least one hand of the user.

9. The haptic feedback device of claim 8, wherein the handheld device is a remote control device for controlling one or more functions of an electronic device or appliance.

10. The haptic feedback device of claim 1, further comprising a second actuator coupled to the touch screen to apply a second force to the touch screen.

11. The haptic feedback device of claim 1, wherein at least the first force is output substantially perpendicular to the plane of the touch screen.

12. The haptic feedback device of claim 1, wherein the first actuator is a piezo-electric actuator.

13. The haptic feedback device of claim 1, wherein the first actuator is a voice coil actuator.

14. The haptic feedback device of claim 1, wherein the first actuator includes a solenoid.

15. The haptic feedback device of claim 1, further comprising a touch screen microprocessor separate from the computer device configured to provide control signals to the first actuator.

16. The haptic feedback device of claim 1, wherein the touch screen is disposed in a housing that is separate from the computer.

17. The haptic feedback device of claim 1, further comprising a touch screen microprocessor separate from the computer device and configured to provide control signals to control the first actuator.

18. The haptic feedback device of claim 1, wherein the first actuator outputs a continuous vibration or a pulse tactile sensation on the touch screen.

19. The haptic feedback device of claim 1, wherein the second signal is used in a rate control function of a value.

20. The haptic feedback device of claim 1, wherein the second signal is used in conjunction with a button press.

21. The haptic feedback device of claim 1, wherein the second signal is used in one or more of: a running of a program, an opening or closing of a window, a navigation of a web browser, a powering on or off of a computer, an initiation of a sleep mode in a computer, an electronic mail function, a gaming function, or a word processing function.

22. The haptic feedback device of claim 1, wherein the second signal is used in a scrolling function.

23. The haptic feedback device of claim 1, wherein the first region is demarcated from the second region by one or more of: a visual demarcation, an audible demarcation, or a tactile demarcation.

24. The haptic feedback device of claim 1, wherein a size or a shape of at least one of the first region or the second region is adjustable.

25. The haptic feedback device of claim 1, wherein the first force is assignable by a user.

26. The haptic feedback device of claim 1, further comprising a second actuator configured to provide a second force, wherein the first actuator is coupled to the first region and the second actuator is coupled to the second region to provide the second force to the second region.

27. A method, comprising:
outputting, by a touch screen operative to display a graphical image, a position signal associated with cursor positioning, wherein the touch screen comprises a first region associated with the cursor positioning and a second region configured to provide a second signal different from the first signal and associated with a control functionality different from cursor positioning, and wherein the first and second regions are associated with different haptic effects; and
imparting, by at least a first actuator, a first force to the touch screen to thereby provide a haptic effect in response to the cursor positioning or the control functionality different from cursor positioning, the first force based on information output by a computer device.

28. The method of claim 27, wherein the second signal is used in a rate control function of a value.

29. The method of claim 27, wherein the second signal is used in conjunction with a button press.

30. The method of claim 27, wherein the second signal is used in one or more of: a running of a program, an opening or closing of a window, a navigation of a web browser, a powering on or off of a computer, an initiation of a sleep mode in a computer, an electronic mail function, a gaming function, or a word processing function.

31. The method of claim 27, wherein the second signal is used in a scrolling function.

32. The method of claim 27, wherein the first region is demarcated from the second region by one or more of: a visual demarcation, an audible demarcation, or a tactile demarcation.

33. The method of claim 27, wherein a size or a shape of at least one of the first region or the second region is adjustable.

34. The method of claim 27, wherein the first force is assignable by a user.

35. The method of claim 27, further comprising imparting, by a second actuator a second force to the second region.

* * * * *